United States Patent
Fujisawa

[19]

[11] Patent Number: 5,497,366
[45] Date of Patent: Mar. 5, 1996

[54] OPTICAL-PICK UP DEVICE USING MULTI-LENS HOLDER

[75] Inventor: Hirotoshi Fujisawa, Tokyo, Japan

[73] Assignee: Sony Corporation, Tokyo, Japan

[21] Appl. No.: 357,610

[22] Filed: Dec. 15, 1994

[30] Foreign Application Priority Data

Dec. 29, 1993 [JP] Japan .................. 5-355379

[51] Int. Cl.$^6$ .................................. G11B 7/00
[52] U.S. Cl. ................ 369/112; 369/109; 369/120; 369/44.37
[58] Field of Search .................. 369/109, 112, 369/44.37, 44.38, 44.39, 44.42, 106, 103, 116, 120

[56] References Cited

U.S. PATENT DOCUMENTS

| | | | |
|---|---|---|---|
| 4,581,728 | 4/1986 | Nakamura et al. | 369/44.37 |
| 4,656,618 | 4/1987 | Kaku et al. | 369/112 |
| 4,669,071 | 5/1987 | Minami et al. | 369/120 |
| 4,670,869 | 6/1987 | Chen | 369/109 |
| 4,773,053 | 9/1988 | Gottfried | 369/120 |
| 4,908,813 | 3/1990 | Ojima et al. | 369/109 |
| 5,073,884 | 12/1991 | Kobayashi | 369/44.37 |
| 5,189,655 | 2/1993 | Ogata et al. | 369/116 |

*Primary Examiner*—Loha Ben
*Attorney, Agent, or Firm*—Limbach & Limbach

[57] ABSTRACT

In an optical pick-up device adapted for detecting light reflected from a disc by using a photo detector to drive an object lens in focus and tracking directions on the basis of a detected signal of the photo detector, a multi-lens for improving sensitivity and accuracy of the photo detector and a multi-lens holder for holding the multi-lens are provided, wherein the multi-lens holder is such a shape that it traverses a first optical path from a light source to a beam and traverses a second optical path from the beam splitter to the photo detector. Thus, adjustment of the spacing between the multi-lens and the photo detector can be facilitated, and the shape of the optical pick-up device itself can be thin and light-weight.

6 Claims, 15 Drawing Sheets

5,497,366

OPTICAL-PICK UP DEVICE USING MULTI-LENS HOLDER

BACKGROUND OF THE INVENTION

1. Field of the Invention

This invention relates to an optical pick-up device adapted for reproducing information signals recorded in a signal recording area of a disc-shaped optical recording medium such as an optical disc or magneto-optical disc, etc., or recording information signals onto such optical recording medium.

In the specification of the invention of this application, the above-mentioned optical recording medium will be referred to as optical disc hereinafter.

2. Description of the Related Art

As representative of optical recording media used in an optical disc recording and/or reproducing apparatus, there are known optical discs having a diameter of 64 mm onto which information signals, e.g., audio signals, etc. of recording time of about 74 minutes can be recorded. As shown in FIGS. 1 and 2, with a view of protecting an optical disc 1 at the time of non-use such as storage, etc. and attaining simplicity of handling, the optical disc 1 is rotatably contained (accommodated) within a cartridge body 5 of a structure in which square upper and lower halves 3 and 4 are formed of molded synthetic resin material, and are connected with their rising peripheral walls being butted to each other. The above-mentioned optical disc recording and/or reproducing apparatus will be referred to as a recording/reproducing apparatus.

On the lower half side 4 of cartridge body 5, there is an opening 6 for admission of a disc turn table of a disc rotary drive mechanism to rotationally drive the optical disc 1 contained in disc cartridge 2 that is loaded into the recording/reproducing apparatus.

In a more practical sense, as shown in FIG. 2, this disc turn table admission opening 6 is formed in such a manner as to expose the central portion of optical disc 1, which includes a metallic plate 7 for magnetic clamping.

Moreover, at upper and lower surfaces of cartridge body 5, i.e., upper and lower halves 3 and 4, there are openings 8, 9 for recording/reproduction of information signals such that at least a portion of the signal recording area of optical disc 1 contained therein is exposed toward the outside.

These information signal recording/reproduction opening portions 8, 9 have a square form and extend from the front end surface side of cartridge body 5 to a position close to the disc table admission opening 6 as shown in FIGS. 1 and 2.

These information signal recording/reproduction opening portions 8, 9 are opened and closed by a shutter 10 which is substantially U-shaped in cross section and is fitted and disposed from the front end surface side of cartridge body 5.

Namely, when this disc cartridge 2 is not used, information signal recording/reproduction opening portions 8, 9 are closed by shutter 10. When this shutter 10 is located at the position where information signal recording/reproduction opening portions 8, 9 are closed, it is locked by a lock member disposed within cartridge body 2, and is held at the closed position.

The disc cartridge 2 constituted in a manner described above is formed so as to have dimensions sufficient to accommodate optical disc 1 having diameter (R) of 64 mm as indicated by single dotted slanting lines of FIG. 1.

In actual terms, this disc cartridge 2 is formed so that width (W1) in a direction where shutter 10 moves to open and close information signal recording/reproduction opening portions 8, 9 is 68 mm, width (W2) in a direction perpendicular to the direction where shutter 10 moves is 72 mm, and thickness (D) is 5 mm.

Moreover, information signal recording/reproduction opening portions 8, 9 formed at cartridge body 5 are formed so that length (L1) extending in the radial direction of optical disc 1 is 24 mm and width (W3) is 17 mm as shown in FIG. 2. By employing such a compact disc cartridge 2 for storage of recording medium, it is possible to miniaturize the recording/reproducing apparatus itself.

Meanwhile, in recording/reproducing apparatus using an optical disc as recording medium, there is provided an optical pick-up device adapted for converging (focusing) incident laser beams emitted from a light source such as semiconductor laser, etc. into the signal recording area of optical disc 1 to irradiate them thereinto, and detecting return laser beams from the optical disc 1 to thereby record information signals onto optical disc or to reproduce information signals recorded on the optical disc 1.

This optical pick-up device comprises an optical system block comprised of optical parts of a semiconductor laser as a light source for emitting incident laser beams irradiated onto optical disc 1, a photo detector for detecting return laser beams from optical disc 1, and a beam splitter, etc. for carrying out separation of incident laser beams emitted from the semiconductor laser and return laser beams from optical disc 1; and an object lens drive unit provided with an object (objective) lens for focusing incident laser beams emitted from the light source into the signal recording area of optical disc 1 and for allowing incident laser beams to follow recording tracks of the optical disc.

An object lens drive unit constituting an optical pick-up device used in conventional recording/reproducing apparatus comprises, as shown in FIG. 3, base member 11 constituting a magnetic circuit section, bobbin support 12 attached on this base member 11 in a cantilever supporting manner, and bobbin 14 supported on the bobbin support 12 with object lens 13 being attached thereon.

A pair of supporting pins 16, 17 positioned on both sides of base end portion 15 and adapted for supporting fixed portion 24 provided on the base end side of bobbin support 12 are vertically provided on base member 11.

At both sides of the front end sides of base member 11 opposite to the base end side where the supporting pins 16, 17 are vertically provided, a pair of yokes 18, 19 formed in a rising manner (hereinafter simply referred to as rising-formed) so as to take substantially U-shape are provided.

At inside surfaces of one pieces 18a, 19a constituting the yokes 18, 19, magnets 20, 21 are respectively attached.

Bobbin support 12 is comprised of molded body of synthetic resin material and includes fixed portion 24 in which pin through (penetration) holes 22, 23 through which supporting pins 16, 17 are respectively inserted are bored at the base end side thereof.

From one side surface of this fixed portion 24, a pair of parallel supporting arms 25, 26 are extended. Front end sides of the parallel supporting arms 25, 26 are connected by connecting piece 28.

At the connecting portion side to the fixed portion 24 and the connecting portion side to the connecting piece 28 of the pair of parallel supporting arms 25, 26, focusing direction displacement portions 27a, 27b and 29a, 29b which are caused to have a small thickness are respectively formed in parallel and extending in the width direction.

By forming focusing direction displacement portions 27a, 27b and 29a, 29b in a manner as described above, a pair of parallel supporting arms 25, 26 can be caused to undergo displacement in parallel to the axial direction of supporting pins 16, 17 for supporting fixed portion 24.

At the front end surface sides of connecting pieces 28, bobbin attachment portion 32 is provided through thin tracking direction displacement portion 31 formed in,parallel to the axial direction of supporting pins 16, 17 for supporting fixed portion 24.

At bobbin attachment portion 32, tubular formed bobbin 14 is attached. At this bobbin 24, lens attachment portion 33 for attaching object (objective) lens 13 at one side thereof is integrally provided.

Object lens 13 is attached on this lens attachment portion 33 through a lens holder fitted and disposed in a fitting hole formed at lens attachment portion 33. Extending from the other end side of bobbin 14 to the central portion thereof, substantially U-shaped cut portion 34 in which a pair of parallel supporting arms 25, 26 extend are formed.

At the side surface of the inner side of the cut portion 34, fitting recessed portion 35 into which bobbin attachment portion 32 provided at the front end side of bobbin support 12 is fitted is formed. At the opening end side of the cut portion 34, weight 36 for maintaining weight balance with respect to object lens 13 attached on lens attachment portion 33 is attached.

At the both side portions opposite to each other of bobbin 14, coil attachment portions 37, 38 formed in a recess shape are provided.

At the coil attachment portions 37, 38, focusing coils 39, 40 wound in a square tubular form are respectively attached. At the outer side surface sides of these focusing coils 39, 40, respective pairs of tracking coils 41, 42 wound in a flat square form are attached.

Bobbin 14 in which object lens' 13 is attached on bobbin attachment portion 32 through lens holder is supported on bobbin support 12 by fitting bobbin attachment portion 32 provided at the front end sides of a pair of parallel supporting arms 25, 26 into fitting recessed portion 35 formed at the side surface of the inner side of cut portion 34.

Bobbin support 12 on which the bobbin 14 is supported is attached on base member 11 by inserting supporting pins 16, 17 into pin through holes 22, 23 bored at fixed portion 24. Thus, object lens drive unit is constituted.

Magnets 20, 21 attached to one pieces 18a, 19a are respectively caused to be opposed to focusing coils 39, 40 and tracking coils 41, 42 as the result of the fact that the other pieces 18b, 19b of yokes 18, 19 provided at base member 11 are inserted through tubular formed focusing coils 39, 40 which are attached to bobbin 14.

In the object lens drive unit thus constituted, when a drive current corresponding to focus error signal is delivered to focusing coils 39, 40, a driving force in the focusing direction which is the direction in parallel to the optical axis of object lens 13 is produced in cooperation with magnetic flux of magnets 20, 21.

By this driving force, a pair of parallel supporting arms 25, 26 are caused to undergo elastic (resilient) displacement in the focusing direction indicated by arrow F in FIG. 3 with focusing direction displacement portions 27a, 27b and 29a, 29b being the point of displacement.

By this elastic (resilient) displacement, object lens 13 attached on bobbin 14 supported at the front end sides of a pair of parallel supporting arms 25, 26 is displaced in the focusing direction. Thus, focusing with respect to optical disc 1 is carried out.

When a drive current corresponding to tracking error signal is delivered to tracking coils 41, 42, driving force is produced in tracking direction perpendicular to the optical axis of object lens 13 in cooperation with magnetic flux of magnets 20, 21.

By this driving force, bobbin 14 supported at the front end sides of a pair of parallel supporting arms 25, 26 is caused to undergo displacement in tracking direction which is the direction indicated by arrow T in FIG.@ 3 with tracking direction displacement portion 31 being the point of displacement.

As the result of the fact that object lens 13 is caused to undergo displacement in the tracking direction (radial direction of optical disc 1) which is the direction perpendicular to the optical axis of object lens 13 as described above, tracking control conducted so that laser beams follow recording tracks of optical disc 1 is carried out.

An optical block constituting an infinite optical system comprised of optical parts including the above-mentioned object lens 13 shown in FIG. 4 is combined with the object lens drive unit constituted in a manner stated above. Thus, an optical pick-up device is constituted.

This infinite optical system constitutes a first optical path by optical parts (components) of semiconductor laser 44 as a light source for emitting laser beams, grating 45 serving as a diffraction lens for optically separating components of emitted laser beams (into spectral components), beam splitter 46 for optically separating a portion of laser beams (into spectral components), and collimator lens 47 for changing laser beams passed through the beam splitter 46 into laser beams (rays) of parallel light, which are disposed on the same optical axis, and reflection mirror 48 disposed at an angle of 45 degrees relative to the above-mentioned optical axis and adapted to change traveling direction of laser beams by 90 degrees to allow them to be incident to object lens 13.

Further, the infinite optical system constitutes a second optical path by multi-lens 49, and photo detector 30 comprised of photo detecting element to which reflected laser beams passed through the multi-lens 49 are incident, which are disposed oppositely to beam splitter 46 on the optical axis perpendicular to the above-described first optical path.

Accordingly, laser beams irradiated onto the signal recording area of optical disc 1 through object lens 13 are reflected by the optical disc 1, and rays of reflected light are incident to object lens 13. Further, rays of light emitted from the object lens 13 are incident to reflection mirror 48, by which traveling direction is changed by 90 degrees. The rays of reflected light thus obtained are then incident to beam splitter 46 through collimator lens 47.

At the beam splitter 46, traveling directions of the reflected laser beams are changed by substantially 90 degrees and are separated into @ spectral components toward side directions. The spectral components thus obtained are then incident to multi-lens 49. In order to improve sensitivity and accuracy of photo detector 30, this multi-lens 49 shapes reflected laser beams to allow those shaped laser beams to be incident to photo detector 30. This multi-lens 49 is supported by multi-lens holder 49A adjustably movable along the optical axis of the second optical path. By implementing adjustably movable operation to the multi-lens holder 49A, reflected laser beams are caused to be incident to photo detector 30 in an optimum state.

Meanwhile, in the object lens drive unit conventionally used, as described above, fixed portion 24 provided at the base end side of bobbin support 12 is supported by base member 11, and bobbin 14 on which object lens 13 is attached is supported through bobbin attachment portion 32 provided at the front end sides of a pair of parallel supporting arms 25, 26 extending from the fixed portion 24.

Further, the magnetic circuit section composed of yokes 18, 19 and magnets 20, 21, which produces a driving force for driving object lens 13 attached on bobbin 14 to allow it to undergo displacement in a direction in parallel to the optical axis of object lens 13 and in a direction perpendicular to the optical axis along with focusing coils 30, 40 and tracking coils 41, 42 attached at the bobbin 14, is of a structure in which it is disposed between fixed portion 24 to base member 11 and object lens 13.

For this reason, a pair of parallel supporting arms 25, 26 for supporting bobbin 14 are elongated, and the length from fixed portion 24 to the front end of bobbin 14 also becomes great. As a result, the object lens drive unit itself also becomes large-sized.

Accordingly, when such object lens drive unit is applied to recording/reproducing unit using for storage of recording medium, disc cartridge 2 within which the above-described optical disc having diameter of 64 mm is contained, only a portion of bobbin 14 including object lens 13 is faced to information signal recording/reproduction opening portions 8, 9 provided at cartridge body 5, and the remaining portions would be disposed in the state extended to the lower surface side of cartridge body 5.

For this reason, object lens drive unit is required to be disposed at a position remote from the lower surface of disc cartridge 2 mounted in recording/reproducing apparatus in order that when object lens 13 is caused to undergo displacement in optical axis direction, bobbin 14 and/or bobbin support 12 are not in contact with cartridge body 5 of the peripheral edge, etc. of information signal recording/reproduction opening portion 9.

When object lens drive unit is disposed at a position remote from disc cartridge 2 in this way, focal distance (length) of object lens 13 which places a focal point of light flux in the signal recording area of optical disc 1 also becomes large.

As a result, object lens 18 further becomes greater, leading to further enlargement of object lens drive unit provided with such object lens 13. Accordingly, it extremely becomes difficult to realize miniaturization of recording/reproducing apparatus using such object lens drive unit.

In view of,this, there has been already proposed an object lens drive unit in which a differential distance, which is the distance from the end surface of object lens 13 up to the signal recording area of optical disc 1, is reduced to permit employment of compact object lens 13 having small focal distance, thereby making it possible to allow such unit to be compact.

This object lens drive unit has a configuration as shown in FIG. 6 such that lens supporting piece 43 is projected, i.e., provided in a projected manner from the upper surface of one end side of bobbin 14, lens attachment portion 33 is provided on the lens supporting piece 43, and object lens 13 is attached through the lens attachment portion 33. By employing such configuration, object lens 13 is caused to be faced into information signal recording/reproduction opening portions 8, 9 of disc cartridge 2. For this reason, the object lens 13 can be close to optical disc 1.

Accordingly, in this object lens drive unit, the differential distance between object lens 13 and optical disc 1 can be reduced. In this case, compact object lens 13 is employed, thereby making it possible to further miniaturize the entirety of the unit.

However, even if object lens 13 is caused to be compact to realize miniaturized (compact) object lens drive unit in this way, since this unit is of a structure in which portions except for object lens. 13 are disposed in the state extended to the lower surface side of cartridge body 5, recording/reproducing apparatus provided with such object lens drive unit cannot be compact as a whole.

Further, in the object lens drive unit adapted so that object lens 13 is attached through lens supporting piece 43, deformation of lens supporting piece 43 or parallel supporting arms 25, 26 becomes conspicuous by aged deterioration. For this reason, the optical axis of object lens 13 was inclined, resulting in the problem that the optical axis cannot be maintained vertically to optical disc 1 with high accuracy.

Further, in the above-described object lens drive unit, since only the object lens 13 is projected from bobbin 14 so as to allow it to be close to optical disc 1, object lens 13 would, be disposed at a position spaced from the magnetic circuit section which produces the driving force. Thus, it becomes difficult to allow the object lens 13 to undergo displacement with good response with respect to driving force corresponding to focus error signal and tracking error signal.

As a result, the recording/reproducing apparatus became unable to precisely carry out focus control and tracking control of object lens 13, resulting in the problem that there is a possibility that recording and/or reproduction of information signals cannot be carried out with good recording/reproducing characteristics.

Furthermore, in the optical pick-up device in which optical block constituting the infinite optical system is combined with the above-described object lens drive unit, a large-sized beam splitter 46 is required because of large beam diameter. For this reason, the entirety of the device also becomes large-sized. In this case, since the optical path is also long, slightly large-sized multi-lens holder 49A can be used. Thus, multi-lens 49 can be firmly held. However, there was the problem that the entirety of the device is further large-sized.

Accordingly, this invention has been proposed with a view to providing an optical pick-up device in which optical parts including object lens caused to be compact are reasonably arranged, thereby permitting the entirety of the device to be further compact.

Further, this invention has been proposed with a view to providing an optical pick-up device in which adjustment operation of optical parts is facilitated and durability is improved against aged deterioration.

SUMMARY OF THE INVENTION

An optical pick-up device according to this invention which has attained the above-mentioned objects is characterized in that an optical system is includes by an object lens supported by an object lens drive unit and is adjustably moved in a focusing direction and in a tracking direction. The optical system also includes a light source, a reflection mirror for changing the traveling direction of incident laser beams emitted from the-light source to guide it to the object lens, a beam splitter for optically separating incident laser beams emitted from the light source and reflected laser beams from an optical disc incident through the object lens, a photo detector for receiving reflected laser beams optically separated by the beam splitter, and a multi-lens disposed between the photo detector and the beam splitter and adapted for shaping the form of reflected laser beams optically separated by the beam splitter. The light source, the reflection mirror, the beam splitter and the photo detector constitute the optical system, which is assembled on a base member and supported thereon. The multi-lens is assembled into a multi-lens holder which is movably supported on the base member along a second light path constituted between the beam splitter and the photo detector bridging over a first light source constituted between the light source and the beam splitter so that opposite spacing between the multi-lens and the photo detector can be adjustably moved.

Moreover, the optical pick-up device according to this invention is characterized in that the multi-lens holder within which the multi-lens is assembled is caused to be movably actuated along the second light path with the side surface of optical parts attachment portions adapted so that optical parts are fitted thereat, and formed in a projected manner from the rising peripheral wall of the base member oppositely thereto being as reference surface.

Further, the optical pick-up device according to this invention is characterized in that a guide projection adapted to be fitted into a guide groove formed at the bottom wall of the base member in parallel to the optical parts attachment portions so that loose movement in a direction perpendicular to a moving direction is limited.

Further, the optical pick-up device according to this invention is characterized in that the multi-lens is integrally assembled into multi-lens holder of synthetic resin by the insert molding method.

Furthermore, the optical pick-up device according to this invention is characterized in that the multi-lens holder is caused to be resiliently in contact with a resilient holding portion integrally formed on a resilient holding member for resiliently holding, in fitting direction, optical parts fitted and assembled at the optical parts attachment portion formed at the base member so that loose movement in the moving direction is limited.

In addition, the optical pick-up device according to this invention is characterized in that an engagement portion facing the position eccentric with respect to a circular adjustment hole board at the bottom wall of the base member is formed at the multi-lens holder, and that an adjustment jig, in which an engagement piece to be engaged with the engagement portion is projected at a supporting portion having a diameter slightly smaller than the hole diameter of the adjustment hole, is inserted into the adjustment hole to rotationally manipulate it to thereby movably actuate-the multi-lens holder.

DESCRIPTION OF THE PREFERRED EMBODIMENT

A preferred embodiment in more practical sense of this invention will now be described with reference to the attached drawings.

Figure 1:
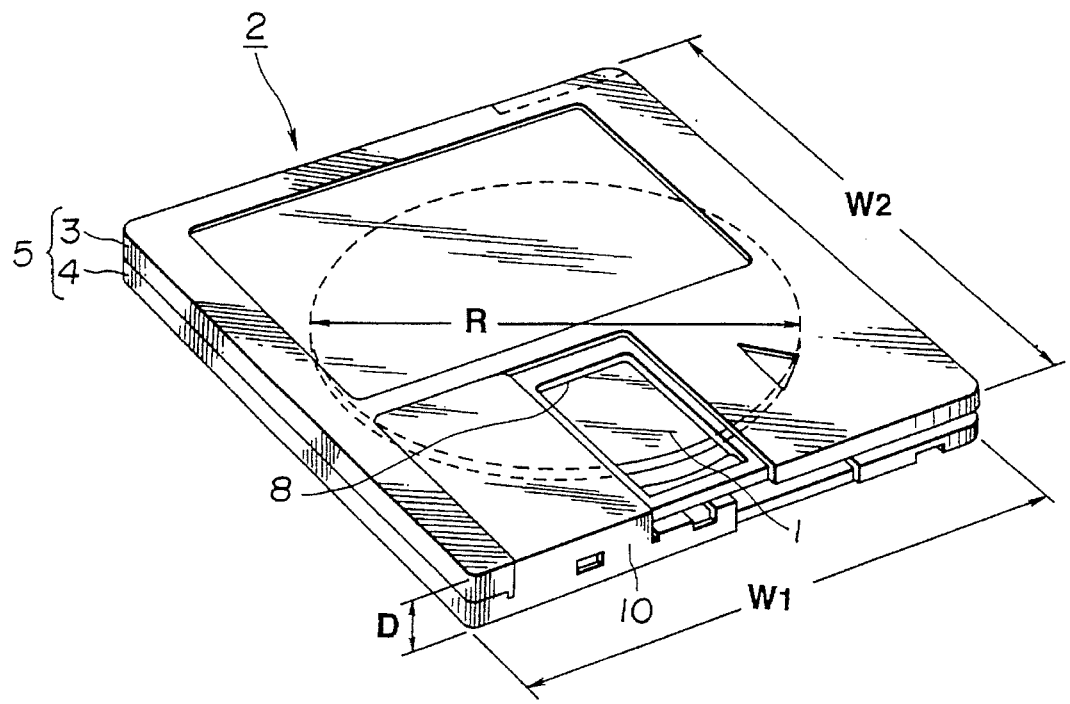
FIG. 1 is a perspective view of a disc cartridge used in a recording/reproducing apparatus.
Figure 2:
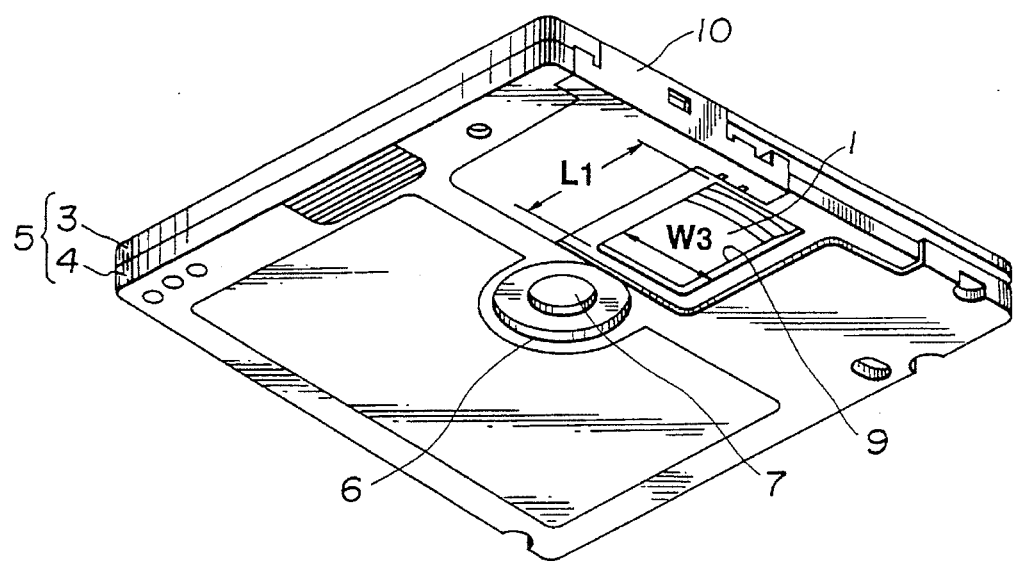
FIG. 2 is a perspective view from the bottom surface of the disc cartridge used in the recording/reproducing apparatus.
Figure 3:
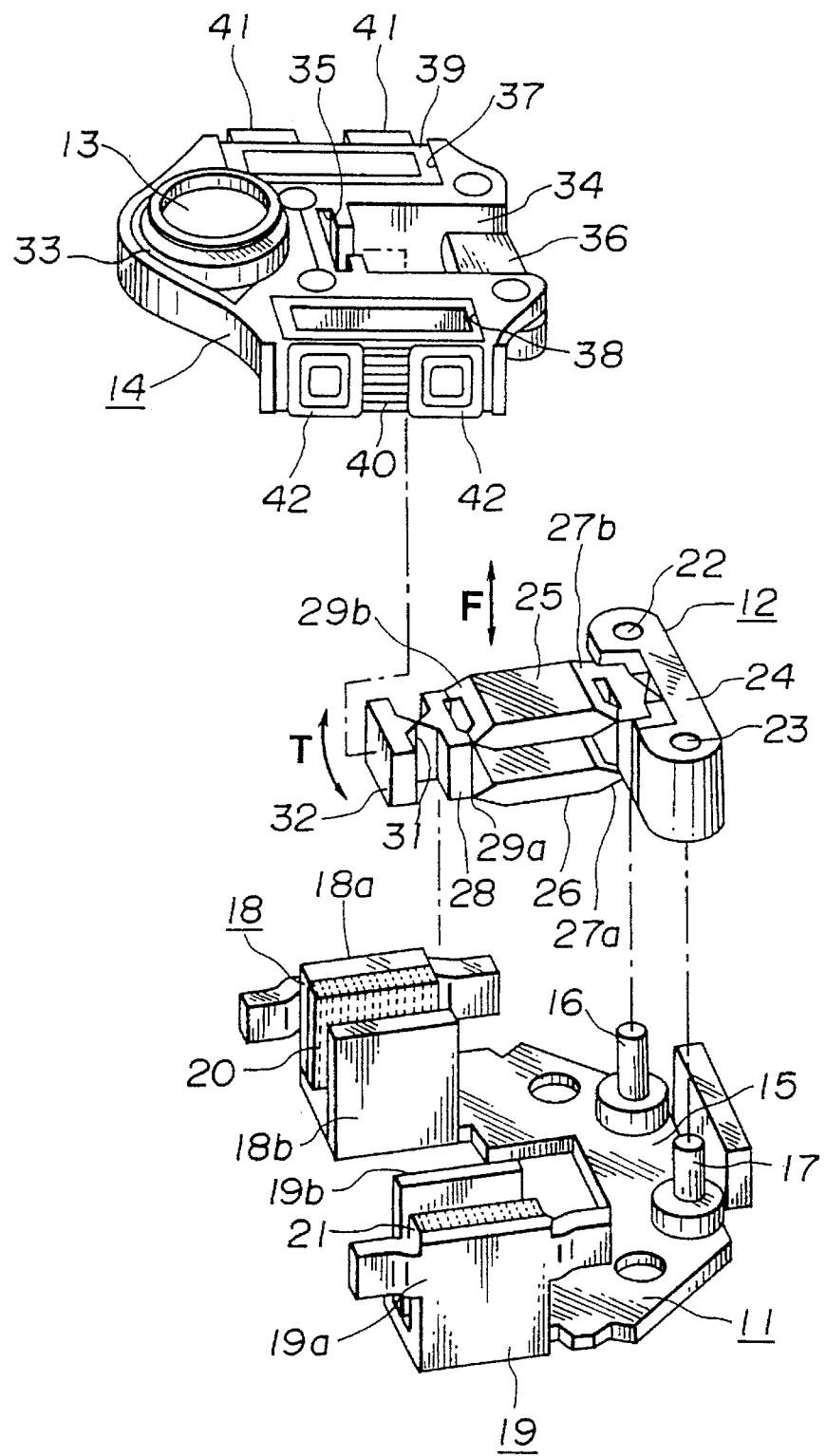
FIG. 3 is an exploded perspective view of a conventional optical pick-up device.
Figure 4:
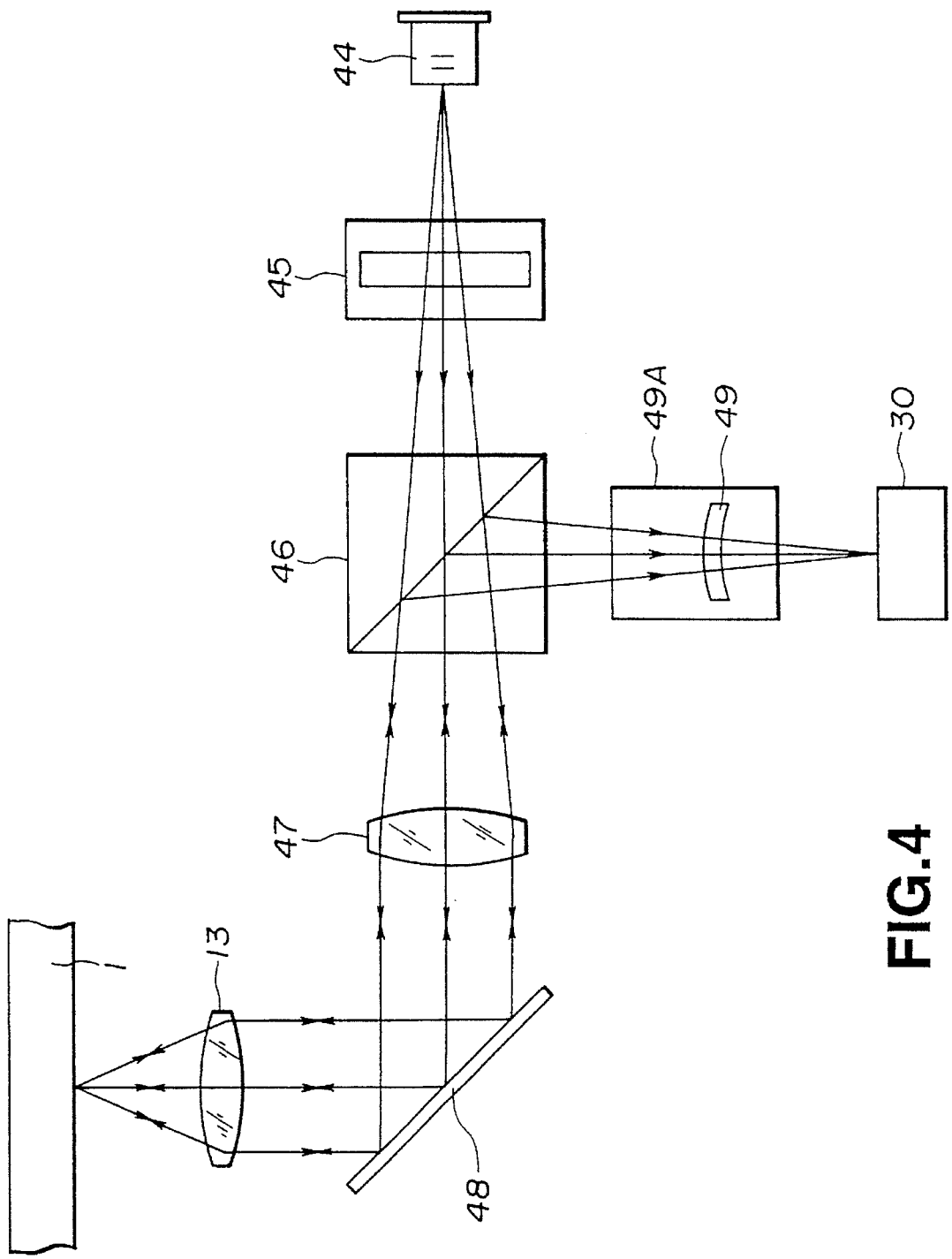
FIG. 4 is a model view of an optical system of the conventional optical pick-up device.
Figure 5:
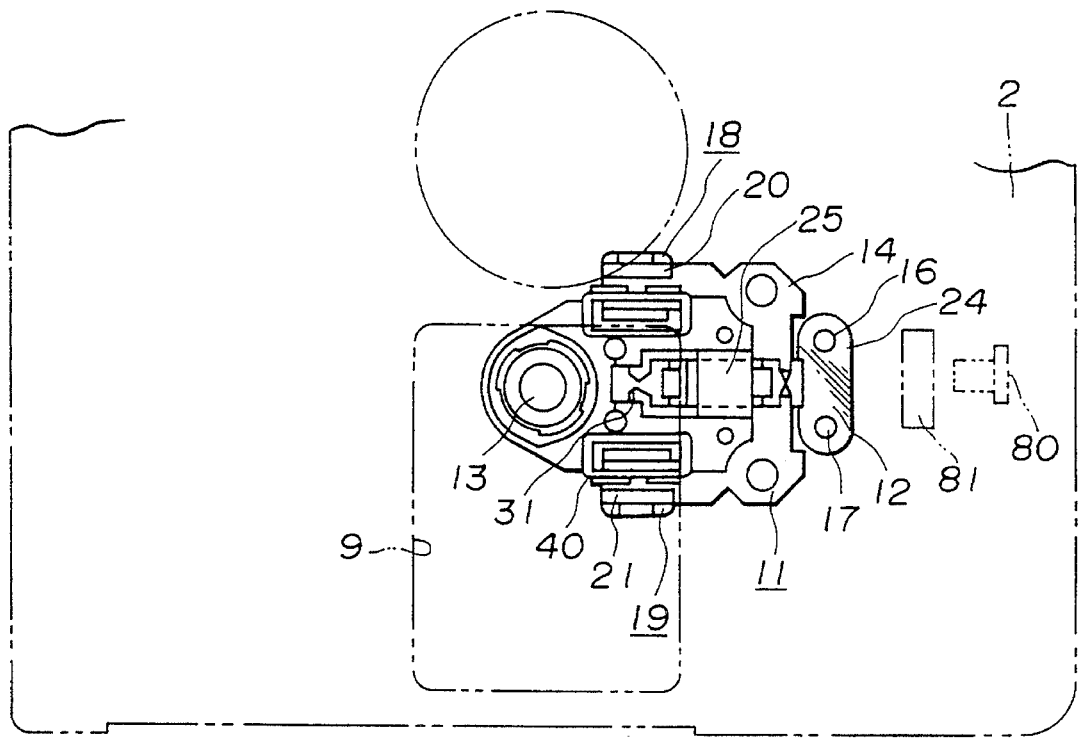
FIG. 5 is a plan view showing the essential part of a recording/reproducing apparatus provided with the conventional pick-up device.
Figure 6:
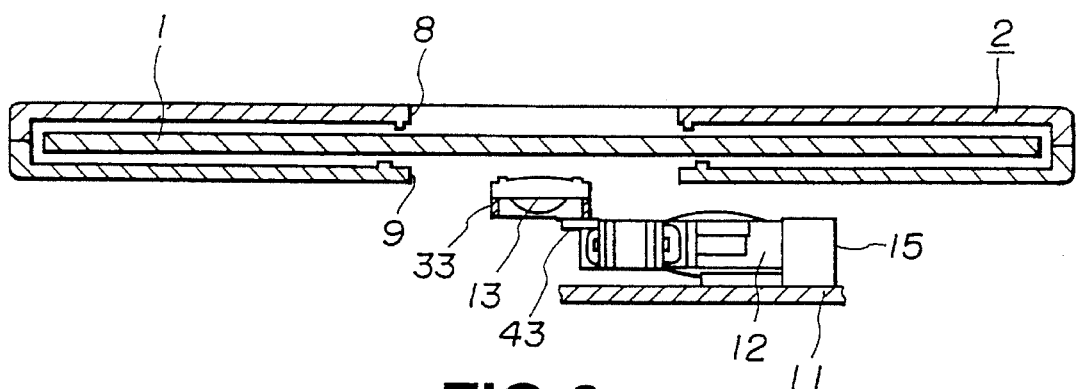
FIG. 6 is a longitudinal cross sectional view showing the essential part of a recording/reproducing apparatus provided with another conventional optical pick-up device.
Figure 7:
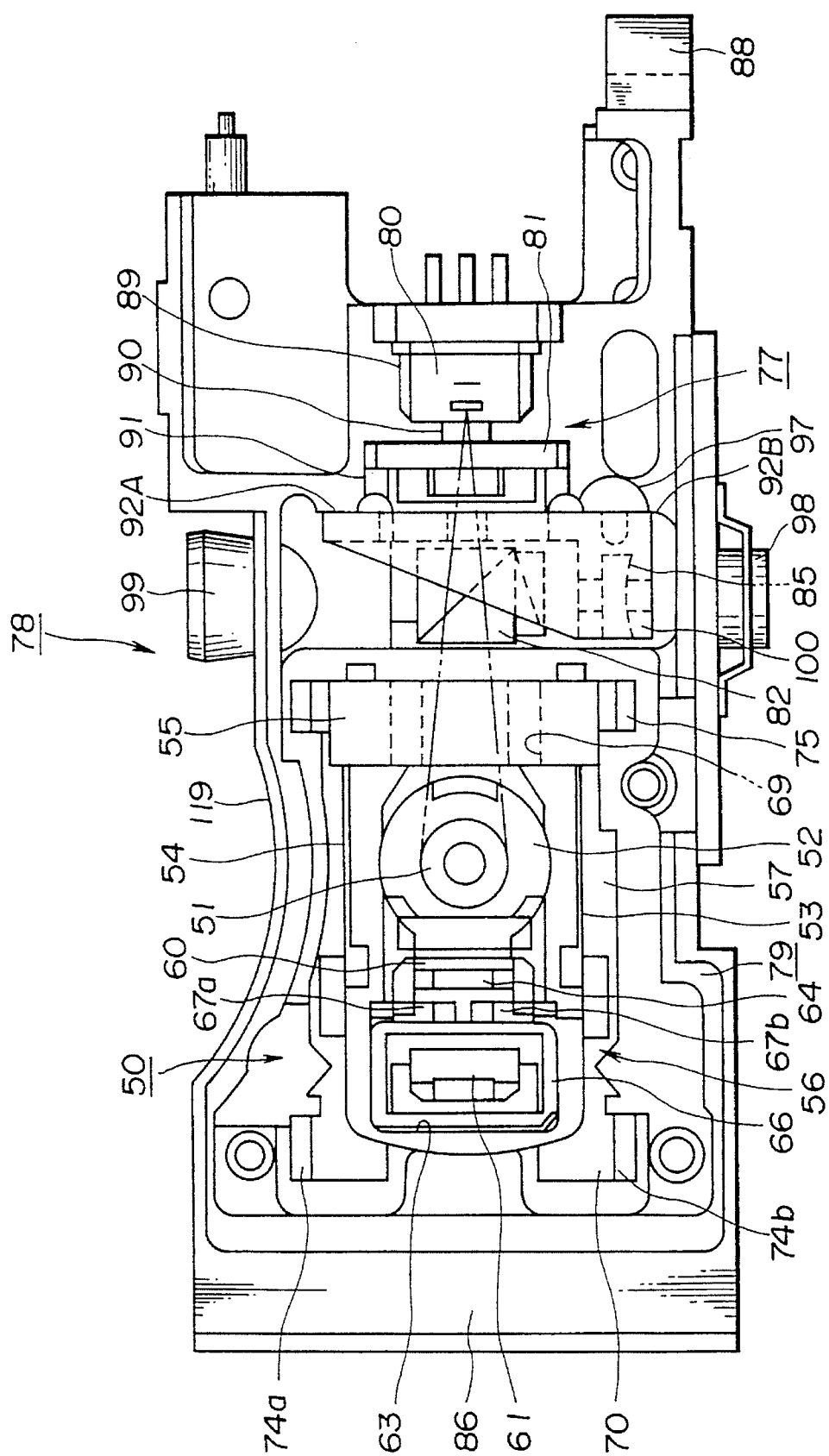
FIG. 7 is a plan view of an optical pick-up device of the invention of this application.
Figure 8:
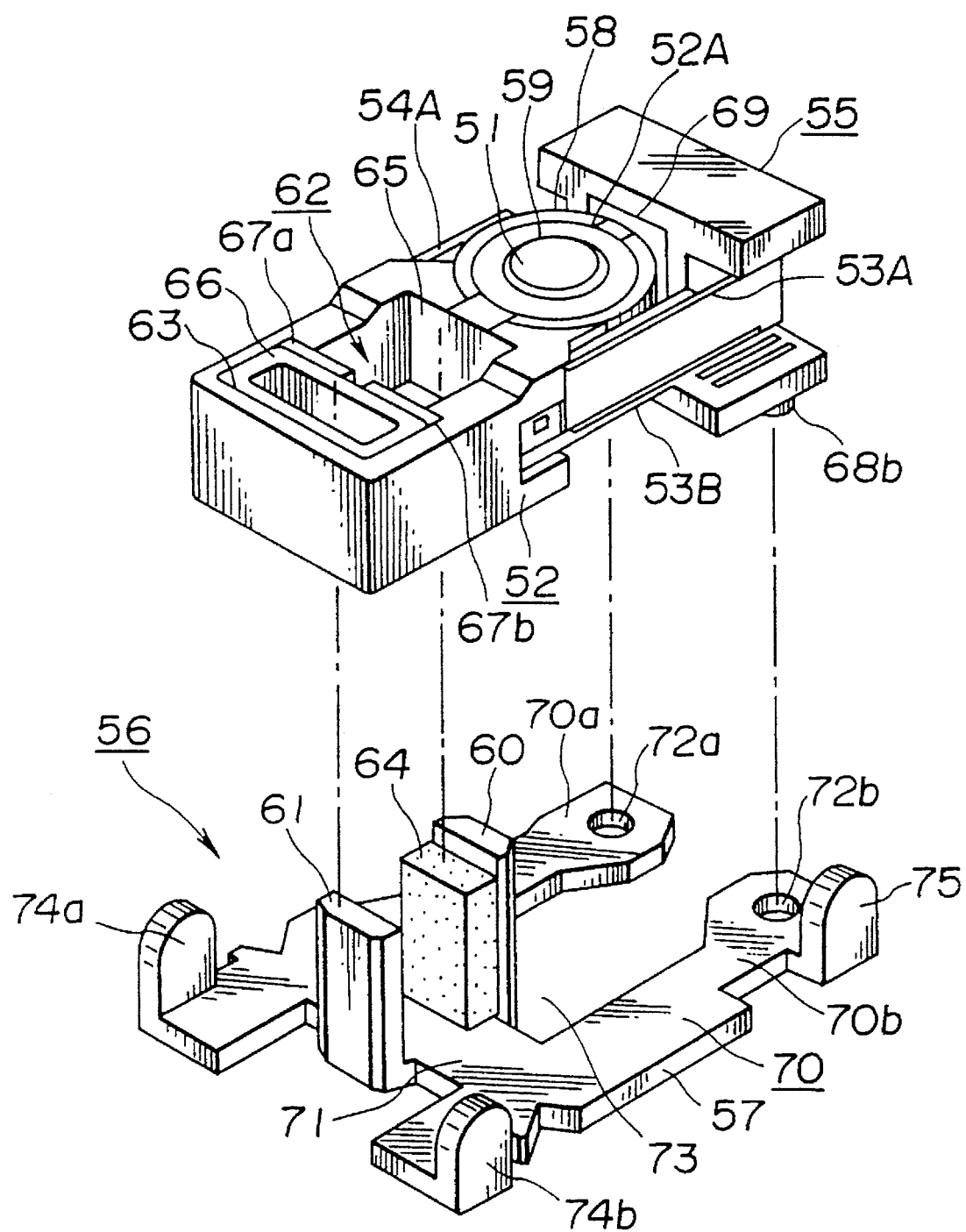
FIG. 8 is an exploded perspective view showing a movable portion including bobbin and magnetic circuit section of the optical pick-up device of the invention of this application.
Figure 9:
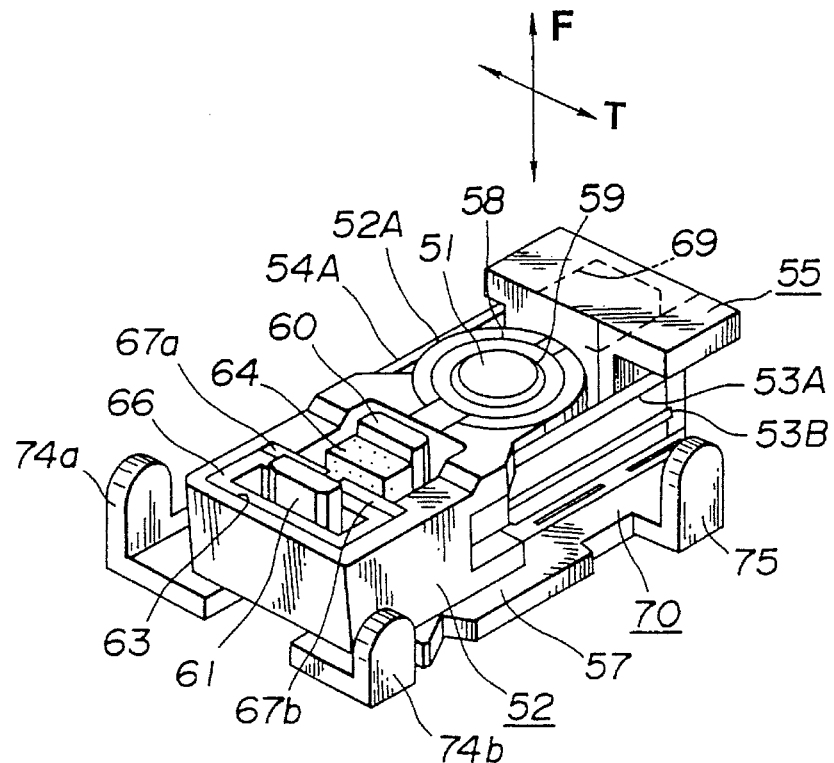
FIG. 9 is a perspective view of an object lens drive unit of the optical pick-up device of the invention of this application.

As illustrated in FIGS. 7, 8, 9, object lens drive unit 50 is a device adapted to drive object lens 51, which serves to converge incident laser beams emitted from semiconductor laser 80 as a light source onto the signal recording area of optical disc 1 where information signals such as musical signals, etc. will be recorded into or were already recorded thereinto. The lens 51 undergoes displacement in a focusing direction (parallel to the optical axis of this object lens 51) or in a tracking direction (perpendicular to the optical axis of the object lens 51).

This object lens drive unit 50 comprises, as shown in FIGS. 7, 8 and 9, as major components, bobbin 52 on which object lens 51 is attached, respective pairs of left and right resilient supports 53A, 53B and 54A, 54B (not shown in FIGS. 8 and 9) for supporting the bobbin 52 so that it is permitted to undergo displacement in two axes directions perpendicular to each other, which are the direction parallel to the optical axis of object lens 51 indicated by arrow F in FIG. 9, and the direction perpendicular to the optical axis indicated by arrow T unit 50 also includes support holder, 55 serving as a fixed portion for fixedly supporting the end portions of the pairs of resilient supports 53, 54, and yoke 57 constituting magnetic circuit section 56 on which the support holder 55 is attached.

Bobbin 52 constituting object lens drive unit 50 is molded of synthetic resin material having excellent heat resistance properties and high rigidity, e.g., PPS (polyprostylene) resin. Object lens attachment portion 58 is formed as a substantially disc-shaped projection integrally provided at one end side of the bobbin 52. This object lens attachment portion 58 is formed in such a manner that it is projected from the upper edge of one end side of bobbin body 52A toward the upper direction, and lens attachment hole 59 is formed at the central portion. The object lens 51 is attached in the state where it is embedded so that the upper end surface thereof is not projected from the lens attachment hole 59 by holding the outer peripheral edge side on holding step portion formed at the inner peripheral edge of the lens attachment hole 59. At the substantially central portion of bobbin body 52A, as shown in FIGS. 8 and 9, there is an opening 62 into which focusing coil 66 is attached, and into which a pair of rising pieces 60, 61 extend, which are opposite to each other and are formed on yoke 57.

A magnetic field of the magnetic circuit section 56 and focusing coil 66 creates a driving force for driving object lens 51 to allow it to undergo displacement in the direction indicated by arrow F in (parallel to the optical axis).

In this opening portion 62, there is a coil attachment portion 63, and a magnet insertion portion 65 where magnet 64 (attached on the rising piece 60 formed at yoke 57) is inserted and disposed.

At coil attachment portion 63 of opening portion 62, focusing coils 66 serving as a first coil which produces a driving force for driving object lens 51 to allow it to undergo displacement in the direction indicated by arrow F (parallel to the optical axis) in cooperation with magnetic field from magnet 64 (constituting magnetic circuit section 56) is attached in a manner opposite to the magnet 64.

This focusing coil 66 is wound in a square tubular form which has dimensions substantially in correspondence with dimensions of coil attachment portion 63 where the winding direction is parallel to the optical axis of object lens 51 attached on bobbin 52. The focusing coil 66 is attached to bobbin 52.

Focusing coil 66 is positioned at the other end side of bobbin 52 so that it is fitted into coil attachment portion 63 as shown in FIG. 8. Namely, focusing coil 66 is fitted and disposed within coil attachment-portion 63 in such a manner to allow the outer peripheral surface thereof to be in contact with the surface of the other end side of coil attachment portion 63. In this embodiment, focusing coil 66 is integrally attached to bobbin 52 by connecting (bonding) the outer peripheral surface opposite to the inner peripheral surface of coil attachment portion 63 by using a bonding agent.

A pair of tracking coils 67a, 67b are attached to the outer peripheral surface side of focusing coil 66 within coil attachment portion 63. These tracking coils serve as a second coil to produce a driving force for driving the object lens 51 to allow it to undergo displacement in the direction indicated by arrow T (perpendicular to the optical axis) in cooperation with magnetic field of magnetic circuit section 56. These tracking coils 67a, 67b are attached in the state where they are disposed on one side surface of focusing coil 66 in parallel to the optical axis of object lens 51. These coils are wound in a square tubular form and exposed to the magnetic insertion portion 65 side of opening portion 62.

Tracking coils 67a, 67b are wound so as to have portions in parallel to the optical axis of object lens 51 attached on bobbin 52 in the state where they are attached on one side surface of focusing coil 66. In actual terms, tracking coils 67a, 67b are wound in a form of a square flat plate, and are wound so as to have linear portions in parallel to the optical axis of object lens 51 at least at sides opposite to each other.

It is sufficient, that these tracking coils 67a, 67b are wound so as to have portions in parallel to the optical axis of object lens 51 attached on bobbin 52 in the state where they are attached on one side surface of focusing coil 66, and it is also sufficient that they are wound in elliptical form where opposite sides are caused to be linear. In this embodiment, a pair of tracking coils 67a, 67b are bonded and attached on one side surface of focusing coil 66 by using a bonding agent.

Moreover, respective pairs of left and right resilient supports 53A, 53B and 54A, 54B for supporting bobbin 52 in a displaceably manner in two axes directions perpendicular to each other (one in the direction in parallel to the optical axis of object lens 51 and the other in the direction perpendicular to the optical axis) are members in a wire.form which are formed by punching a thin metallic plate such as stainless plate, etc. and have sufficient resiliency (elasticity), respectively. These resilient supports 53, 54 are inserted or outserted into a metal mold in molding bobbin 52 and support holder 55, whereby the both end portions thereof are integrally supported by the bobbin 52 and the support holder 55.

One end portion of each resilient supports 53, 54 is positioned at recess-shaped portions formed at both side surface portions of bobbin 52 so that those end portions are integrally supported thereat and the other end portions thereof are positioned at recess-shaped portions formed at both side surface portions of support holder 55 so that those other end portions are supported thereat to thereby connect between bobbin 52 and support holder 55, By positioning resilient supports 63, 54 at recess-shaped portions formed at the both side surface portions of bobbin 52 and support holder 55 in this way, object lens drive unit 50 is constituted so that it does not become large-sized in a width direction.

It should be noted that the above-described wire-shaped resilient supports 53, 54 may be in a plate form, and the essential point is that there may be employed any member which supports bobbin 52 and is capable of allowing the bobbin 52 to undergo elastic (resilient) displacement in the direction in parallel to the optical axis and in the direction perpendicular to the optical axis.

Support holder 55 for fixedly supporting the other end sides of a pair of left and right resilient supports 53, 54 is molded by synthetic resin having excellent heat resistance property and high rigidity, e.g., PPS resin similar to the above-described bobbin 52, wherein recess-shaped portions for fixedly supporting resilient supports 53, 54 are disposed at both side surface portions opposite to each other as described above, and a pair of fitting projections 68, 68 serving as a fixed portion to yoke 57 are projected at the bottom surface portion.

Support holder 55 is attached to the yoke 57 by respectively fitting projections 68a (not shown in FIG. 8), 68b into fitting holes 72a, 72b bored at the other end side of yoke 57.

At support holder 55, light transmission portion 69 for allowing incident laser beams incident to object lens 51 attached on bobbin 52 to be passed therethrough is formed. This light transmission portion 69 is provided at support holder 55 in the state positioned in a direction perpendicular to the optical axis of object lens 51 attached on bobbin 52.

The light transmission portion 69 is formed at support holder 55 in parallel to the extending direction of a pair of resilient supports 53, 54, i.e., and is formed by boring through holes extending over the front and rear end surfaces of support holder 55. It should be noted that this light transmission portion 69 may be constituted by forming cut portions in a recess form from the bottom surface portion of support holder 55 from which fitting projections 68a, 68b are projected.

Here, light transmission portion 69 of support holder 55 is of a structure in which reflected light off of the internal wall constituting the transmission portion 69 from laser beams passed therethrough is reduced so that there, is no stray light in optical path.

The internal walls constituting the light transmission portion 69 have a saw-tooth form such that incident laser beam components impinging on the ceiling wall and both side surface walls thereof are difficult to be reflected into the optical path. Accordingly, with respect to light component directed toward the internal walls of light transmission portion 69, reflection thereof on the internal walls is reduced, so the quantity of stray light can be reduced.

As stated above, laser beams incident to the light transmission portion 69 are caused to undergo optical processing such that the reflected light flux quantity of incident laser beam component directed toward the internal walls constituting the light transmission portion 69 is reduced, and are passed through light transmission portion 69 and incident to the object lens 51 in a stable state. For this reason, in light transmission portion 69 provided at support holder 55, occurrence of stray light phenomenon of laser beams emitted from the light source is reduced in the finite optical system having the above-described configuration of internal walls.

As described above, yoke 57 to which support holder 55 is integrally attached is comprised of high permeability material such as silicon steel, etc., and is formed substantially H-shaped in which a pair of arm portions 70a, 70b are connected by connecting portion 71 as shown in FIG. 8. At the end portions of these pair of arm portions 70a, 70b, fitting holes 72a, 72b are bored, into which fitting projections 68a, 68b provided at support holder 55 are fitted. Moreover, on opposing sides of connecting portion 71 connecting a pair of arm portions 70a, 70b, a pair of rising pieces 60, 61 are formed rising in a manner opposite to each other. By attaching magnet 64 on the surface side of rising piece 60 opposite to the other rising piece 61, magnetic circuit section 56 is constituted.

It should be noted that clearance (gap) 73 constituted between the pair of arm portions 70a, 70b extending from the other end side of yoke 57 toward the connecting portion 71 constitute a first optical path and a second optical path for allowing, when optical pick-up is constituted as described later, incident laser beams emitted from semiconductor laser serving as light source and reflected laser beams reflected from optical disc 1 to be transmitted therethrough. Soldering pieces 74a, are formed at the end portions of the pair of arm portions 70a, 70b opposite the end having fitting holes 72a, 72b, on the side where rising piece 61 is provided. Further, at the side end portion of one arm portion adjacent fitting hole 72b, soldering piece 75 is formed.

When fitting projections 68a, 68b are fitted into fitting holes 72a, 72b of yoke 57 constituting the magnetic circuit section 56 so that support holder 55 is attached thereto, the other rising piece 61 of yoke 57 is inserted into focusing coil 66 which is attached to bobbin 52 attached to one end sides of a pair of resilient supports 53, 54 of which the other end sides are supported by the support holder 55 as shown in FIG. 9.

Moreover, rising piece 60 is inserted into magnet insertion portion 65 formed at bobbin 52 along with magnet 64. The pair of rising pieces 60, 61 opposed to each other with focusing coil 66 and tracking coils 67a, 67b being put therebetween constitute a magnetic path which, crosses (traverses) the focusing coil 66 and tracking coils 67a, 67b.

In the object lens drive unit 50 constituted in a manner stated above, when drive current corresponding to focus error signal detected by photo detector 98 which will be described later is delivered to focusing coil 66, a driving force in direction indicated by arrow F in FIG. 9 (parallel to the optical axis of object lens 51) is produced on the basis of current flowing in the focusing coil 66 in cooperation with magnetic flux from magnet 64 constituting magnetic circuit section 56.

By this driving force, object lens 51 is driven so that it is caused to undergo displacement in the direction indicated by arrow F in FIG. 9 (parallel to the optical axis thereof) along with bobbin 52. Thus, focusing adjustment is carried out. Namely, at this time, a pair of resilient supports 53, 54 which support bobbin 52 on which object lens 51 is attached are caused to undergo elastic (resilient) displacement in the direction indicated by arrow F in FIG. 9 to drive object lens 51 so that it is caused to undergo displacement in a direction parallel to the optical axis thereof.

Moreover, when drive current corresponding to tracking error signal detected by photo detector 98 which will be described later is delivered to tracking coils 67a, 67b, a driving force in the direction indicated by arrow T in FIG. 9 (perpendicular to the optical axis of object lens 51) is produced on the basis of current flowing in each of portions in parallel to the optical axis of object lens 51 of these tracking coils 67a, 67b in cooperation with magnetic flux from magnet 64.

By this driving force, object lens 51 is driven so that it is caused to undergo displacement in the direction indicated by arrow T in FIG. 9 (perpendicular to the optical axis thereof) along with bobbin 52. Thus, tracking adjustment is carried out. Namely, at this time, a pair of resilient, supports 53, 54 are caused to undergo elastic (resilient) displacement, thus to drive object lens 51 so that it is allowed to undergo displacement in a direction perpendicular to the optical axis thereof.

Meanwhile, dimensions of the entirety of the object lens drive unit 50 constituted in a manner as described above for the preferred embodiment are as follows. Namely, width (W4) in tracking direction where bobbin 52 is caused to undergo displacement in a direction perpendicular to the optical axis of object lens 51 is set to a value of 8 mm or less, length (L2) in tangential direction which is the direction perpendicular to the displacement direction is set to a value of 17 mm or less, and its height (H1) is set to a value of 10 mm or less. By forming the object lens drive unit 50 so as to have such dimensions, the embodiment lens drive unit 50 can scan the inner and outer circumferences of the signal recording area of optical disc 1 by incident laser beams irradiated through object lens 51 in the state where it is inserted into information signal recording/reproduction opening portion 9 of disc cartridge 2 within which the above-described optical disc 1 having diameter of 64 mm is contained.

In this case, object lens drive unit 50 can be inserted into information signal recording/reproduction opening portion 9 in the state where the tangential direction is caused to be in parallel to the width (W3) direction of information signal recording/reproduction opening portion 9, and object lens 51 is permitted to undergo displacement in tracking direction of optical disc 1.

Figure 10:
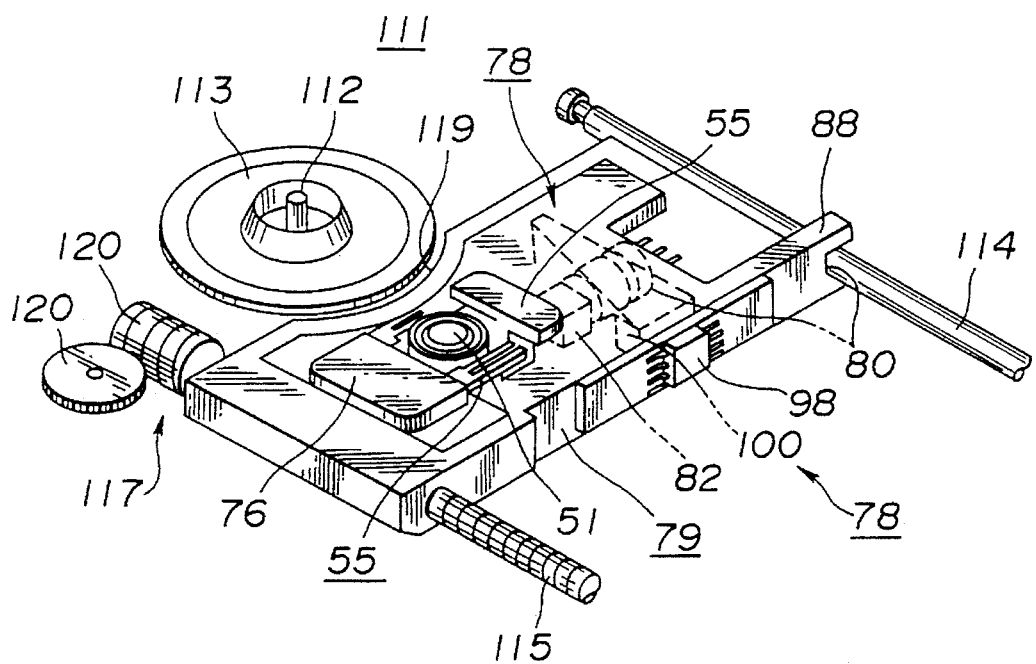
FIG. 10 is a perspective view of the optical pick-up device of the invention of this application.

At the upper end surface sides of a pair of rising pieces 60, 61 constituting yoke 57, there is assembled stopper member 76 for limiting bobbin 52 from slipping off of magnetic circuit section 56 toward the upper direction when object lens 51 is driven so that it is caused to undergo displacement in the optical axis direction as shown in FIG. 10.

Figure 11:
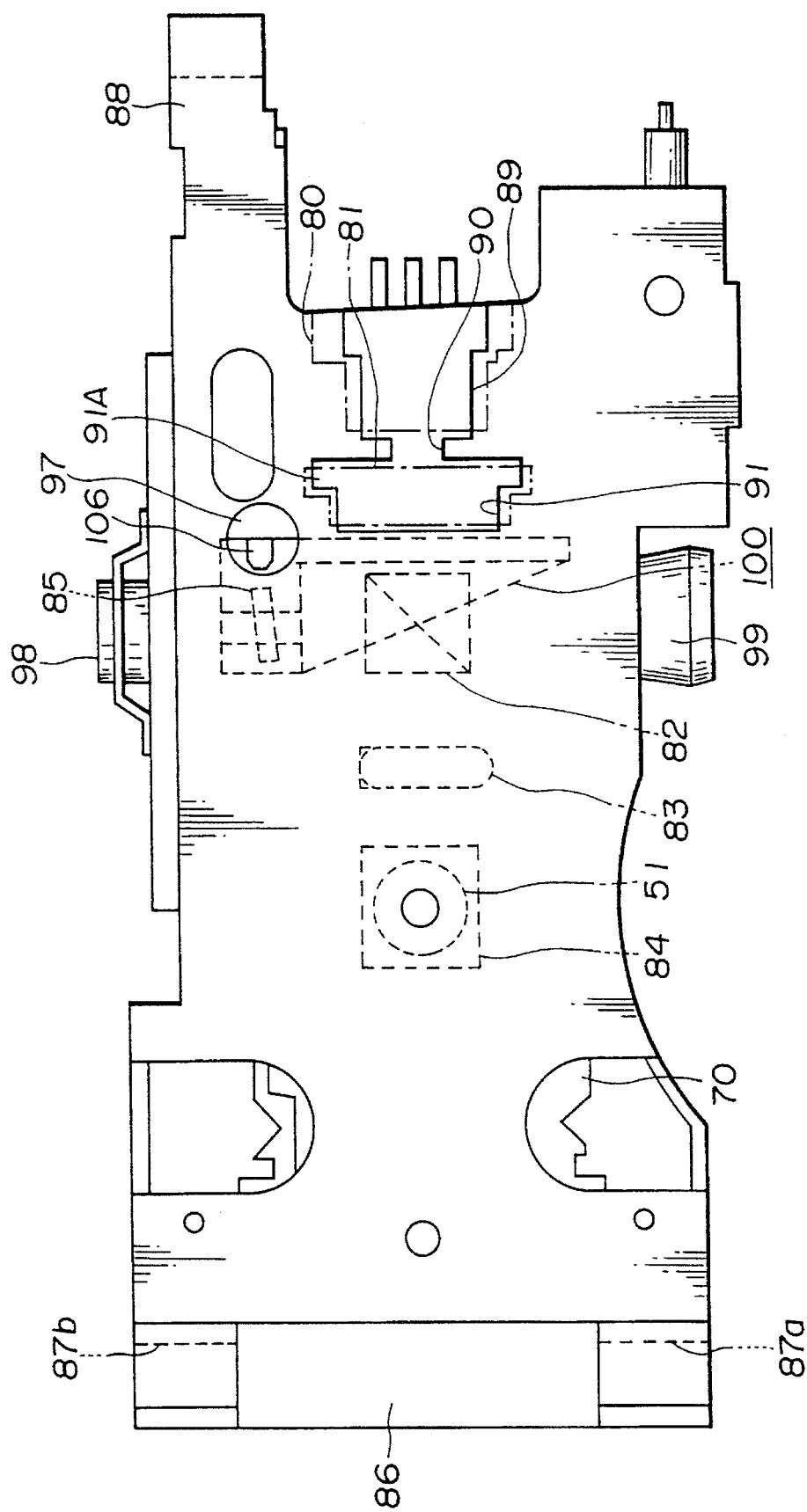
FIG. 11 is a bottom view of the optical pick-up device of the invention of this application.

The object lens drive unit 50 thus constituted is combined, as shown in FIGS. 7 and 11, with optical block 77 comprised of semiconductor laser 80 as a light source for emitting laser beams, grating 81, beam splitter 82, collimator lens 83, reflection mirror 84, multi-lens 85 supported by multi-lens holder 100 which will be described later, and the like, thus to constitute optical pick-up device 78.

This optical pick-up device 78 includes base member 79 on which object lens drive unit 50 is supported. This object lens drive unit 50 is attached with the bottom surface side of yoke 57 constituting magnetic circuit section 56 being supported on base member 79.

This base member 79 is a molded member (body) substantially rectangular as a whole where rising walls are formed rising at both end edges in a length direction by aluminum die-cast or synthetic resin material having excellent heat resistance properties and high rigidity as shown in FIGS. 7 and 11. At one end portion in the length direction on the side where object lens drive unit 50 is attached to the base member 79, there is integrally formed a bearing portion 86 in which axial holes 87a, 87b spaced apart in the width direction through which sled feed screw member 115 (which will be described later) on the recording/reproducing apparatus side is penetrated. Moreover, at the other end portion side in the length direction of base member 79, there is an integrally projected bearing portion 88 through which guide shaft 114 (which will be described later) is penetrated.

Figure 12:
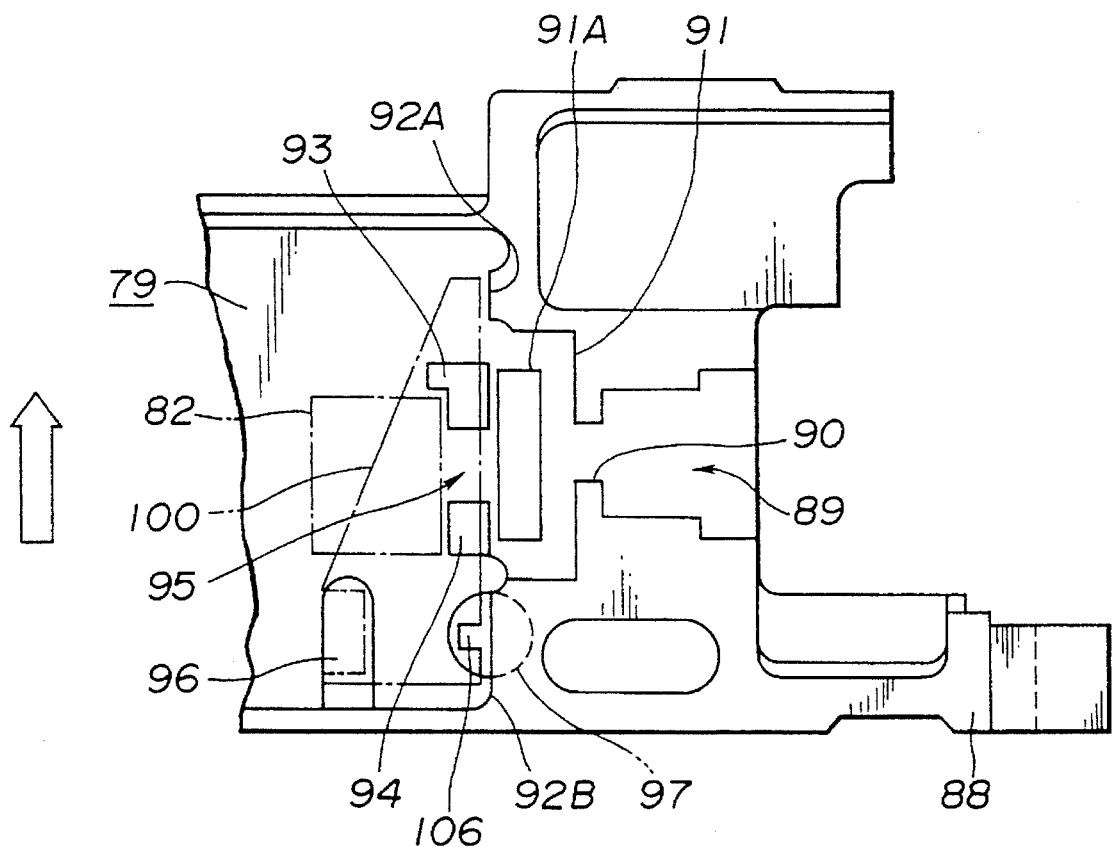
FIG. 12 is a plan view showing the essential part of the base member constituting optical block provided in the optical pick-up device of the invention of this application.

Semiconductor laser fitting portion 89 for fitting semiconductor laser 80 in projection form which is opened toward one side end is bored at the bottom surface portion of base member 79 in such a manner that it is positioned on the side where this bearing portion 88 is integrally projected and is also positioned at the central portion in the width direction as shown in FIG. 12. The opening dimension of this semiconductor laser fitting portion 89 is set to a value slightly smaller than the outside dimension of semiconductor laser 80 to be fitted. Grating fitting recess portion 91 is disposed at the bottom surface portion of base member 79 so as to communicate, through optical path recessed portion 90, to this semiconductor laser fitting recessed portion 89.

In the embodiment, at the bottom surface portion of base member 79 constituting this grating fitting recessed portion 91, square clearance groove 91A is bored. The grating fitting recess portion 91 has supports for supporting the grating 81 protruded and formed integrally with both lateral sides, parallel to the optical path, of the square clearance groove 91A. Further, step portion walls 92A, 92B in the width direction are formed at the bottom surface portion on the side where object lens drive unit 50 is attached of base member 79 constituting this grating fitting recessed portion 91.

As illustrated in FIG. 12, first beam splitter holding projection 93 and second beam splitter holding projection 94, constituting optical-path recessed portion 95 of which axis, is in correspondence with that of the optical path recessed portion 90 by spacing them in the width direction, and are integrally projected in a manner opposite to each other on the bottom surface portion of base member 79 in the state where they are positioned on a line crossing (traversing) base member 79 connecting these step portion walls 92A, 92B. These beam splitter holding projections 93, 94 are formed on the bottom surface portion of base member 79 in the state where the opposite spacing in the width direction is caused to be substantially equal to the width dimension of optical path recessed portion 90 and the height dimension is caused to be smaller than those of step portion walls 92A, 92B. The first beam splitter holding projection 93 is formed substantially L-shaped to thereby hold the two perpendicular side surface portions of beam splitter 82. On the other hand, the second beam splitter holding projection 94 is formed rectangularly to hold one side surface portion of beam splitter 82.

In parallel to one step portion wall 92B, at the bottom surface portion of base member 79, guide groove 96 for guiding multi-lens holder 100 (which will be described later) is disposed in a recessed form. Further, adjustment jig insertion hole 97 constituted as a through hole is bored at the bottom surface portion of base member 79 of the rising portion of step portion wall 92B in such a manner to oppose the guide groove 96.

As shown in FIG. 7, semiconductor laser 80 for emitting laser beams incident to object lens 51 is fitted into semiconductor laser fitting portion 89 of the base member 79 thus constituted. Thus, the semiconductor laser 80 is attached thereto. This semiconductor laser 92 is fitted into semiconductor laser fitting recessed portion 91 in such a manner that the emitting surface of incident laser beams is opposed to light transmission portion 69 provided in support holder 55 constituting object lens drive unit 50, and the optical axis direction of incident laser beams emitted is perpendicular to the optical axis of object lens 51. Thus, the semiconductor laser 92 is attached thereto.

Moreover, reflection mirror 84, for changing the traveling direction of incident laser beams transmitted through light transmission portion 69 by 90 degrees to allow them to be incident to object lens 51, is attached at the bottom surface portion of base member 79 as shown in FIG. 11. This reflection mirror 84 is attached on base member 79 in the state where it is positioned at the lower portion of object lens 51, and the center of the reflection surface is caused to be in correspondence with the optical axis of object lens 51.

Further, grating 81 is fitted into grating fitting recessed portion 91 and is disposed thereby in a manner opposite to the emitting surface of semiconductor laser 80 as shown in FIG. 7. This grating 81 is constituted by a diffraction lens for optically separating components of incident laser beams emitted from semiconductor laser 80 (into spectral components). Beam splitter 82 is disposed so that it is positioned between the grating 81 and the reflection mirror 84 in the state held by first and second beam splitter holding projections 93, 94. The beam splitter 82 serves to allow incident laser beams emitted from semiconductor laser 80 to be passed toward the reflection mirror 84 side along first optical path which will be described later, and to optically separate reflected laser beams from optical disc 1 incident through object lens 51 to reflect them to second optical path perpendicular to the first optical path.

Optical axis (traveling direction) of reflected laser beams incident from the object lens 51 side to the beam splitter 82 is changed by 90 degrees relative to the optical axis of incident laser beams emitted from semiconductor laser 80.

The reflected laser beams are directed out to the outside of beam splitter 82. For this reason, photo detector 98 is attached on one rising side wall of base member 79. Photo detector 98 is a photo detecting element adapted for receiving reflected laser beams optically separated by beam splitter 82, and detecting information signals recorded on optical disc 1, focusing error signals and tracking error signals.

The photo detector 98 is attached on base member 79 in such a manner that the light receiving surface thereof is opposite to the optical axis of traveling reflected laser beams optically separated by beam splitter 82.

Multi-lens 85 for shaping form of reflected laser beams optically separated and reflected at beam splitter 82 is attached on base member 79 through multi-lens holder 100 which will be described later between beam splitter 82 and photo detector 98.

Moreover, beam splitter 82 in the embodiment has a function of optically separating a portion of incident laser beams emitted from semiconductor laser 80 (into spectral components). Namely, this beam splitter 82 changes the optical axis (traveling direction) of a portion of incident laser beams emitted from semiconductor laser 80 by 90 degrees in a direction opposite to that of reflected laser beams to emit it. The portion of incident laser beams optically separated by this beam splitter 82 is used for controlling output of semiconductor laser 80. To this end, second photo detector 99 for detecting a portion of incident laser beams optically separated by beam splitter 82 is attached, in a manner to oppose the photo detector 98, at the rising wall of the other end side of base member 79.

In this embodiment, between beam splitter 82 and reflection mirror 84, collimator lens 83 for changing incident laser beams passed through beam splitter 82 into parallel laser beams is disposed on the bottom surface portion of base member 79 so that their optical axes are in correspondence with each other.

As stated above, optical parts such as semiconductor laser 80, grating 81, beam splitter 82, collimator lens 83, and reflection mirror 84, etc., and photo detectors 98, 99 for receiving reflected laser beams or incident laser beams optically separated by beam splitter 82 which constitute optical block 77 are attached (mounted) to respective attachment (mounting) portions formed at base member 79 of optical pick-up device 78. Thus, these respective constituent members are disposed within a plane parallel to base member 79. As described above, respective members constituting optical block 77 are all disposed on base member 79. Thus, optical pick-up device 78 is permitted to be of thin structure.

Figure 14:
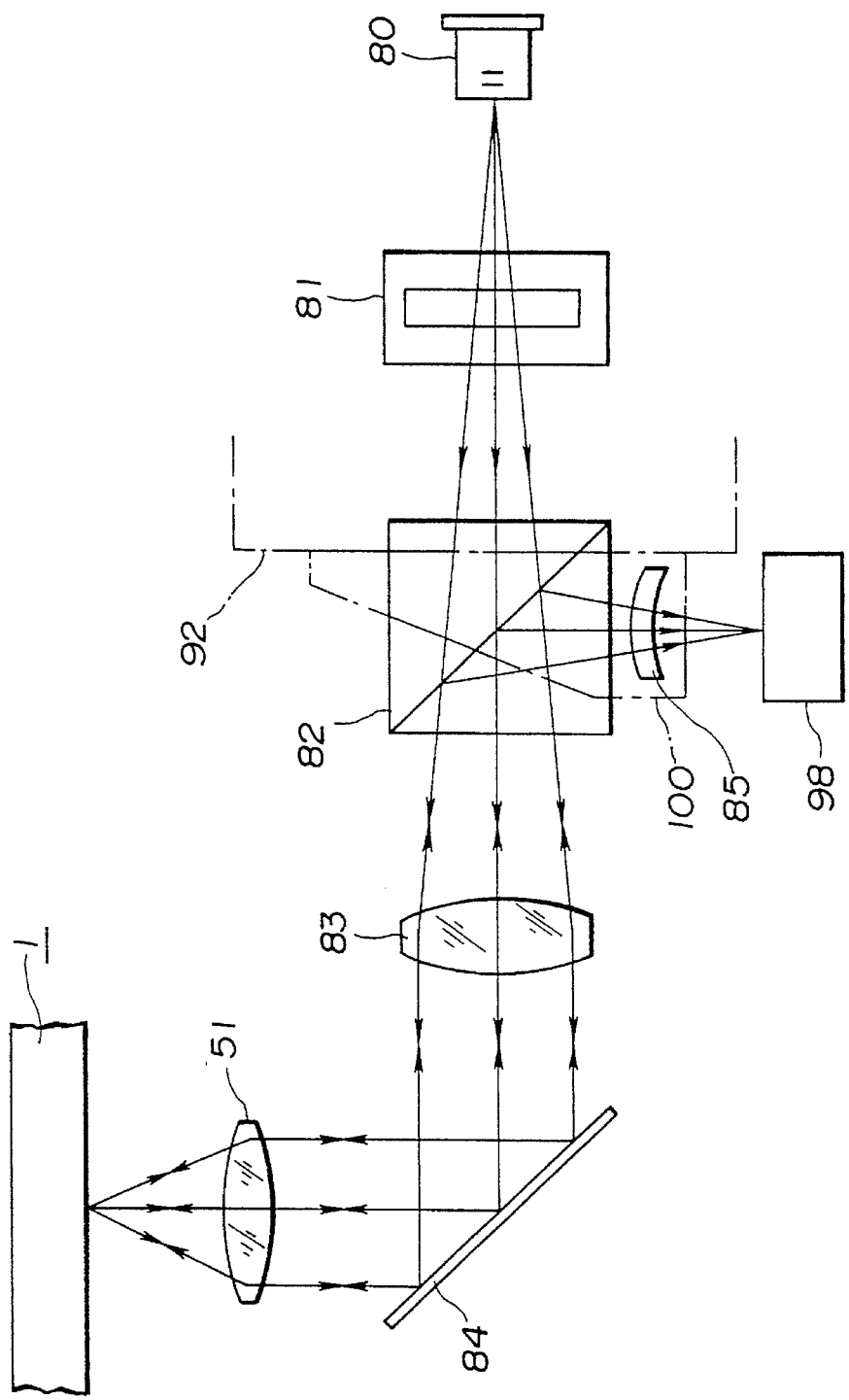
FIG. 14 is a model view showing an optical system of the optical pick-up device according to the invention of this application.

In the optical pick-up device 78 caused to be of thin structure, as shown in FIGS. 11 and 14, there are constituted a first optical path of incident laser beams traveling through emitting surface of semiconductor laser 80 fitted in semiconductor laser fitting portion 89, optical path recessed portion 90, grating 81 fitted in grating fitting recessed portion 91, optical path recessed portion 95, beam splitter 82, collimator lens 83, reflection mirror 84, concave lens 51, and optical disc in order recited; a second optical path of reflected laser beams traveling through optical disc 1, object lens 51, reflection mirror 84, collimator lens 83, beam splitter 82, multi-lens 85, and photo detector 98 in order recited; and a third optical path of incident laser beams traveling through the emitting surface of semiconductor laser 80, optical path recessed portion 90, grating 81, optical path recessed portion 95, beam splitter 82 and photo detector 99 in order recited. These optical paths are constituted within the same plane except for the optical path portion of laser beams traveling reflection mirror 84, object lens 51 and optical disc 1 in order recited.

Incident laser beams incident to object lens drive unit 50 through the above-described first optical path are incident to reflection mirror 84 attached on base member through light transmission portion 68 provided at support holder 55 which supports bobbin 52 through resilient supports 53, 54.

Incident laser beams of which optical axis (traveling direction) is changed by 90 degrees by the reflection mirror 84 are incident to object lens 51 through clearance 73 provided at base member 79.

Since reflection mirror 84 is disposed at the lower side of object lens drive unit 50 and respective optical parts are disposed within a plane parallel to the optical axis of the optical path from semiconductor laser 80 up to reflection mirror 84, object lens drive unit 50 is positioned at the upper side of optical block 77, and is therefore projected in the optical axis direction of the object lens 51 from the entirety of the optical pick-up device 78.

Since only the object lens drive unit 50 is projected toward the upper direction as described above, the object lens drive unit 0.50 formed so as to have dimensions as previously described can be securely inserted into the information signal recording/reproduction opening portion 9 formed in disc cartridge within which optical disc 1 having diameter of 64 mm is contained (accommodated).

This optical pick-up device 78 of the preferred embodiment is applied to the recording/reproducing apparatus using the disc cartridge 2 for storage of the recording medium within which the above-described optical disc 1 having diameter of 64 mm is contained, the disc cartridge 2 being formed so that length (L1) extending in the radial direction of optical disc 1 is set to 24 mm and width (W3) is set to 17 mm, information signal recording/reproduction opening portions 8, 9 being formed at cartridge body 5.

Figure 15:
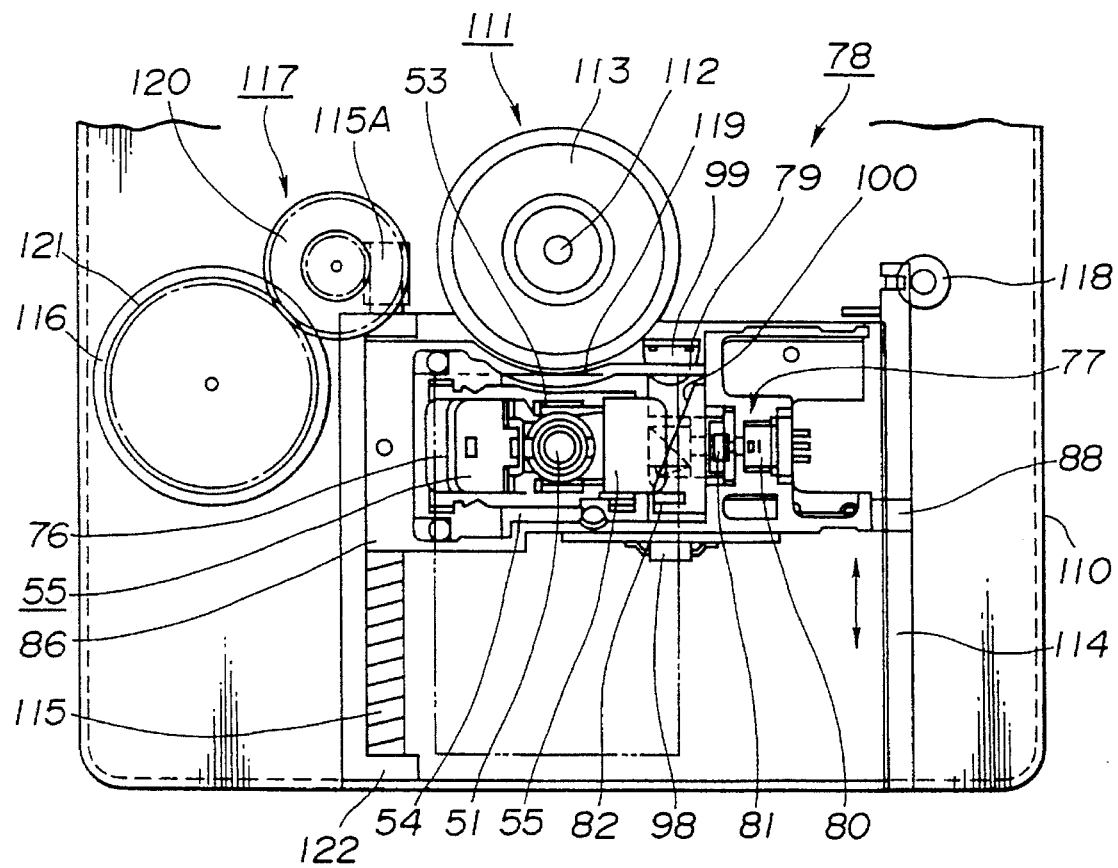
FIG. 15 is a plan view showing the essential part of a recording/reproducing apparatus provided with the optical pick-up device of the invention of this application.

This recording/reproducing apparatus is provided with disc rotational drive mechanism 111 for rotationally manipulating optical disc 1 contained within disc cartridge 2 affixed to cartridge mounting portion 110 constituted within this apparatus body. This disc rotational drive mechanism 111 is of a structure as shown in FIG. 15 such that it is disposed at a substantially central portion of the apparatus body, that optical disc 2 is clamped at the front end side of drive shaft 112 provided at the central portion, and that disc table 113 rotating in one body with this optical disc 2 is attached.

Within the recording/reproducing apparatus, feed guide shaft 114 guides the feed direction of the optical pick-up device 78, of which both ends are supported and mounted by the apparatus frame and bearing screw 118 and sled feed screw 115 which is rotatably supported by substantially U-shaped bearing 122. Feed guide shaft 114 and sled feed screw 115 are disposed parallel to each other.

The feed guide shaft 114 and sled feed screw 115 constitute pick-up feed mechanism 117 along with pick-up feed motor 116 for rotationally driving the sled feed screw 115. They are disposed on a chassis disposed within the apparatus body positioned on both sides of information signal recording/reproduction opening portions 8, 9 of disc cartridge 2 mounted at cartridge mounting portion 110 with optical disc 2 being clamped by disc table 113.

Optical pick-up device 78 is disposed within the recording/reproducing apparatus by inserting feed guide shaft 114 through bearing portion 88 on one end side and inserting sled feed screw 115 through axial holes 87, 87 of bearing portion 86 on the other side. At this time, object lens drive unit 50 is disposed within recording/reproducing apparatus with a pair of resilient supports 53, 54 being extended in a tangential direction to the recording tracks formed on optical disc 1.

Object lens drive unit 50 is disposed within the recording/reproducing apparatus with its length direction being caused to be in correspondence with tangential direction. Moreover, optical block 77 is disposed so that the optical axis from semiconductor laser 80 up to reflection mirror 84 is in parallel to the tangential direction.

Optical pick-up device 78 is disposed within the recording/reproducing apparatus at a height position such that object lens drive unit 50 attached on base member 79 constituting this optical pick-up device 78 can be inserted into information signal recording/reproduction opening portion 9 of disc cartridge 2 mounted in cartridge mounting portion 110.

Optical pick-up device 78 is attached at a height position such that when disc cartridge 2 is mounted in cartridge mounting portion 110 in the state where optical disc 1 is clamped by disc table 113, object lens drive unit 50 is inserted into information signal recording/reproduction opening portion 9 so that at least object lens 51 faces the information recording area of optical disc 1.

Optical pick-up device 78 is attached within the apparatus body with a distance which is not in contact with optical disc i.e., a fixed working distance is kept even in the case where object lens 51 is driven so that it is caused to undergo displacement in focusing direction.

By disposing optical pick-up device 78 within the apparatus body in this way, the distance between object lens 5 and optical disc 1 can be reduced, i.e., so called working distance can be reduced. Accordingly, object lens 51 can become compact and become light-weighted.

Optical pick-up device 78 disposed within the apparatus body is reciprocated in a direction indicated by the arrow in FIG. 15 by pick-up feed mechanism 117 composed of guide shaft 114, sled feed screw 115, pick-up feed motor 116, and deceleration gear mechanisms 120, 121.

Optical pick-up device 78 disposed within the apparatus body as described above is reciprocated in direction indicated by the arrow in FIG. 15 extending over inner and outer circumferences of optical disc 1 as the result of the fact that sled feed screw 115 is rotationally driven by pick-up feed motor 116.

Sled feed screw 115 is connected to the pick-up feed motor 116 as the result of the fact that drive force transmission gear 120, that constitutes deceleration gear mechanism with which gear 121 rotationally manipulated by pick-up feed motor 116 is meshed, is meshed with worm gear 115A provided on one side of this sled feed screw 115. Thus, the sled feed screw 115 is rotated by driving by this pick-up feed motor 116.

In the preferred embodiment, at the other side surface opposite to the disc rotational drive mechanism 111 of optical pick-up device 78 disposed within the apparatus body, a recess shaped portion 119 is formed as shown in FIG. 7 to escape this disc rotational drive mechanism 111.

The recess shaped portion 119 is provided for the purpose of securely feeding optical pick-up device 78 up to the innermost circumference side of optical disc 1 without allowing it to be in contact with disc rotational drive mechanism 111 so that it is possible to securely scan as far as information recording area on the innermost circumference side of optical disc 1 by laser beams.

Moreover, since recess shaped portion 119, to escape disc rotational drive mechanism 111, is provided at optical pick-up device 78, it is possible to use a sufficiently large-sized disc rotational drive mechanism 111. Thus, it is possible to stably carry out rotational operation of optical disc 1.

In place of the feed mechanism of the above-described object lens drive unit 50, a linear motor, which carries out a linear drive, may be used. This linear motor is disposed within the apparatus body in such a manner that the moving direction of a movable part is in parallel to guide shaft 114 for feed-guiding object lens drive unit 50 in inner and outer circumferential directions of optical disc 1.

One end side of base member 79 on which object, lens drive unit 50 is attached is connected to the movable part through connecting member. Thus, object lens drive unit 50 is caused to undergo feed-operation by linear motor extending over the inner and outer circumferences of optical disc 1.

In this case, in the above-described pick-up feed mechanism 117, since a rotary type motor is used as pick-up feed motor 116, sled feed screw 115 is used in parallel to feed guide shaft 114. However, if the pick-up feed mechanism uses a linear motor, any means having a function to support base member 79 may be employed as the guide shaft on the other side, and a member having a shaft shape with no screw, similar to one feed guide shaft 114, can be adopted as sled feed screw 115.

By employing a configuration to carry out feed-operation of only object lens drive unit 50, the weight of the transport body can be reduced. Accordingly, a feed-operation by the pick-up feed mechanism can be carried out at a high speed. Thus, it is possible to provide an access to a desired recording track of optical disc 1 at a high speed.

In the preferred embodiment, the optical pick-up device 78 has a thin structure as described above, and reflected laser beams optically separated by beam splitter 82 are shaped, thus making it possible to carry out detection of the information signal, the focusing error signal and the tracking error signal at photo detector 98 with good accuracy and high sensitivity. For this reason, positional adjustment of multi-lens 85 is carried out through multi-lens holder 100.

Figure 16:
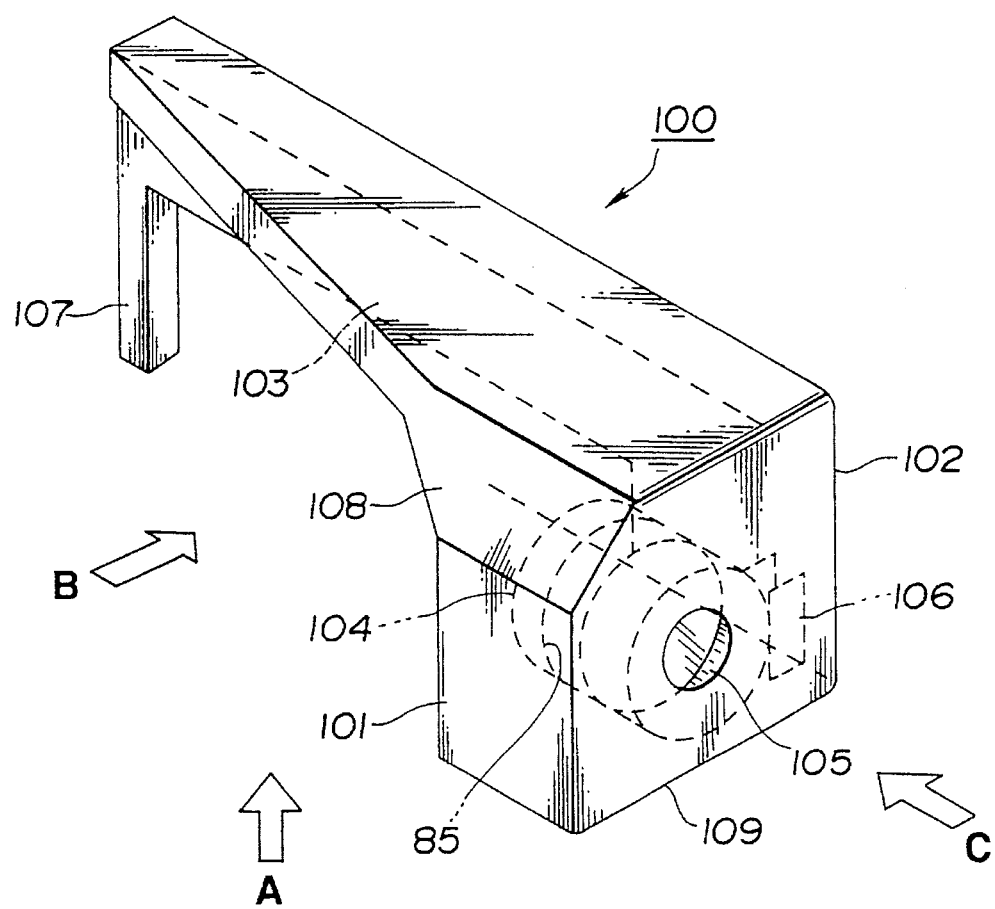
FIG. 16 is a perspective view of a multi-lens holder provided in the optical pick-up device of the invention of this application.

A perspective view of multi-lens holder 100 is shown in FIG. 16. Multi-lens holder 100 is a member having a length slightly shorter than the width of base member 79, and employs, as its material, a light metal or synthetic resin having excellent heat resistance properties and rigidity.

Figure 17:
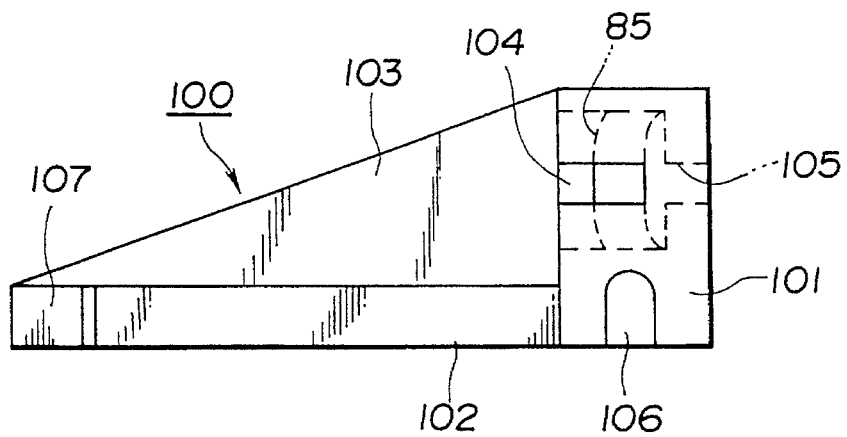
FIG. 17 is a bottom view of the multi-lens holder.

FIG. 17 is a view in which the multi-lens holder is viewed from the bottom surface (direction indicated by arrow A of FIG. 16).

Figure 18:
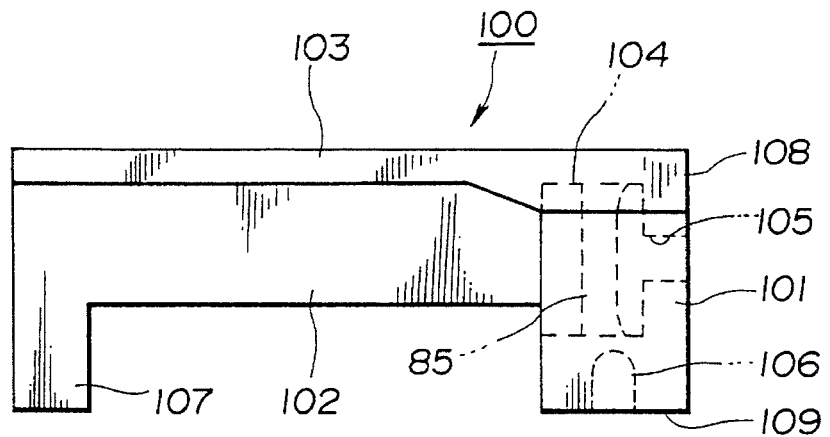
FIG. 18 is a side view of the multi-lens holder.

FIG. 18 is a view in which the multi-lens holder is viewed from the side surface (direction indicated by arrow B of FIG. 16).

Figure 19:
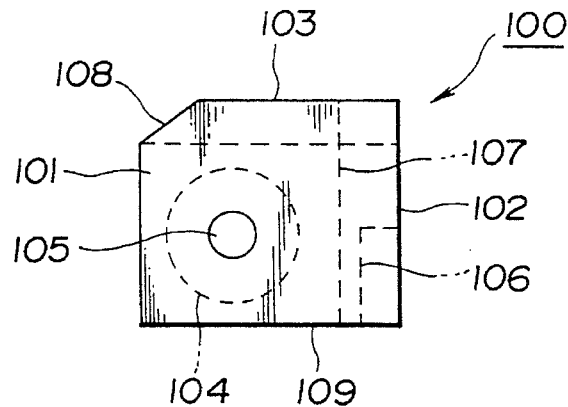
FIG. 19 is a front view of the multi-lens holder.

FIG. 19 is a view in which the multi-lens holder is viewed from the front (direction indicated by arrow C of FIG. 16).

As shown in FIG. 14 and FIGS. 16 to 19, multi-lens holder 100 is composed of base portion 101 in block form, reference side wall portion 102 projected along step portion walls 92A and 92B from the base portion 101, ceiling wall portion 103 in a substantially right angled triangular form, and guide projection 107 disposed vertically in such a manner to oppose the base portion 101 from the front end portion of reference side wall portion 102.

Accordingly, this multi-lens holder 100 is formed so that the side surface shape in the length direction has an inverse recess shape.

At the base portion 101, optical path hole 105, through which reflected laser beams are optically separated (into spectral components) in the side direction of base member 79 by beam splitter 82, is provided in a manner penetrated through the inside and outside walls. Moreover, lens mounting recessed portion 104, concentrical with optical path hole 105, is disposed at the internal wall of the base portion 101. Multi-lens 85 is contained within the lens mounting recessed portion 104 and is connected thereto. Thus, this multi-lens 85 is mounted.

Engagement recessed portion 106 is formed at the side surface of reference side wall portion 102 on the lower surface of base portion 101.

In this embodiment, guide projection 109 is positioned on the side opposite to engagement recessed portion 106 on the lower surface of base portion 101, and slanting surface 108 is formed as an upper edge portion of the guide projection portion 109.

Guide projection 109 has a width dimension substantially equal to the width dimension of recess-shaped guide groove 96 formed at base member 79.

The multi-lens holder 100 is mounted on base member 79 with the reference side wall portion 102 being in slide contact with step portion walls 92A, 92B (constituting grating fitting recessed portion 91) as shown in FIG. 12.

In the multi-lens holder 100 attached in this way, base portion 101 is disposed so that the optical axis of the optical path hole 105 is caused to be in correspondence with the light receiving surface of photo detector 98 attached on base member 79.

Beam splitter holding projections 93, 94 are caused to be in contact with the lower surface of reference side wall portion 102 of the multi-lens holder 100, which limits movement of multiples holder 100 in a direction indicated by the arrow of FIG. 12.

Moreover, in this attachment state, multi-lens holder 100 is such that guide projection 107 is supported on the bottom surface portion of base member 79 and guide projection 109 is engaged with guide groove 96.

Accordingly, multi-lens holder 100, in which multi-lens 85 is mounted, is movably mounted at base member 79 in the state where it bridges over the first optical path of laser beams traveling through the emitting surface of semiconductor laser 80, grating 81 and beam splitter 82 in order recited.

In this embodiment, engagement recessed portion 106 provided at base portion 101 of this multi-lens holder 100 is positioned so as to face adjustment jig insertion hole 97 provided at base member 79.

In this case, engagement recessed portion 106 is faced slightly eccentrically toward one hole wall side relative to the center of adjustment jig insertion hole 97.

Adjustment of opposite spacing between multi-lens 85 and photo detector 98 is carried out by inserting adjustment jig 125 such as driver, etc. from adjustment jig insertion hole 97 to conduct rotational operation thereof.

Figure 20:
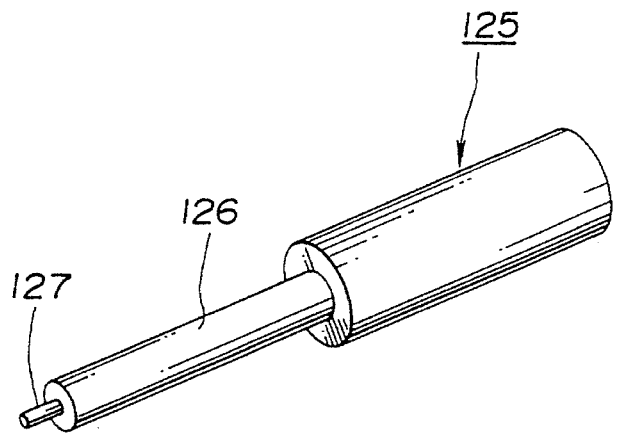
FIG. 20 is a perspective view of an adjustment jig for adjusting the multi-lens holder.

The detail of adjustment jig 125 is as shown in FIG. 20. Namely, engagement piece 127 is provided at the front end portion of supporting portion 126 having a diameter slightly smaller than the hole diameter of adjustment jig insertion hole 97. By inserting engagement piece 127 into adjustment jig insertion hole 97, engagement piece 127 is engaged with engagement recessed portion 106 provided at base portion 101 of multi-lens holder 100.

Accordingly, when adjustment jig 125 is rotationally manipulated, multi-lens holder 100 is moved in direction indicated by arrow of FIG. 12.

Figure 21A:
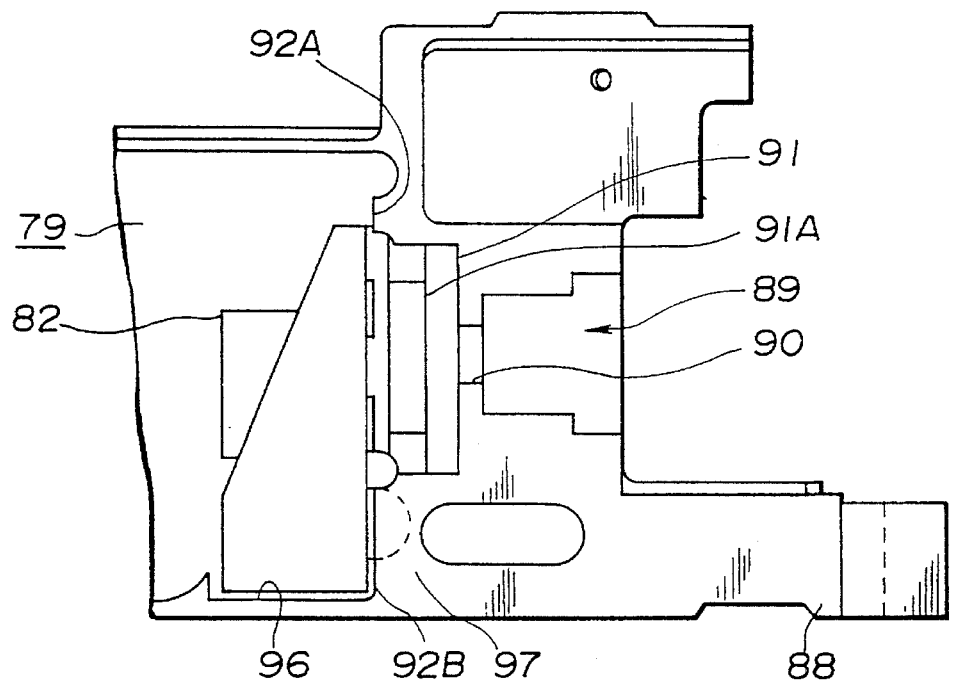
FIGS. 21A and 21B are transition diagrams of the multi-lens holder when the multi-lens holder is attached to the optical pick-up device, and is adjusted by the adjustment jig.
Figure 21B:
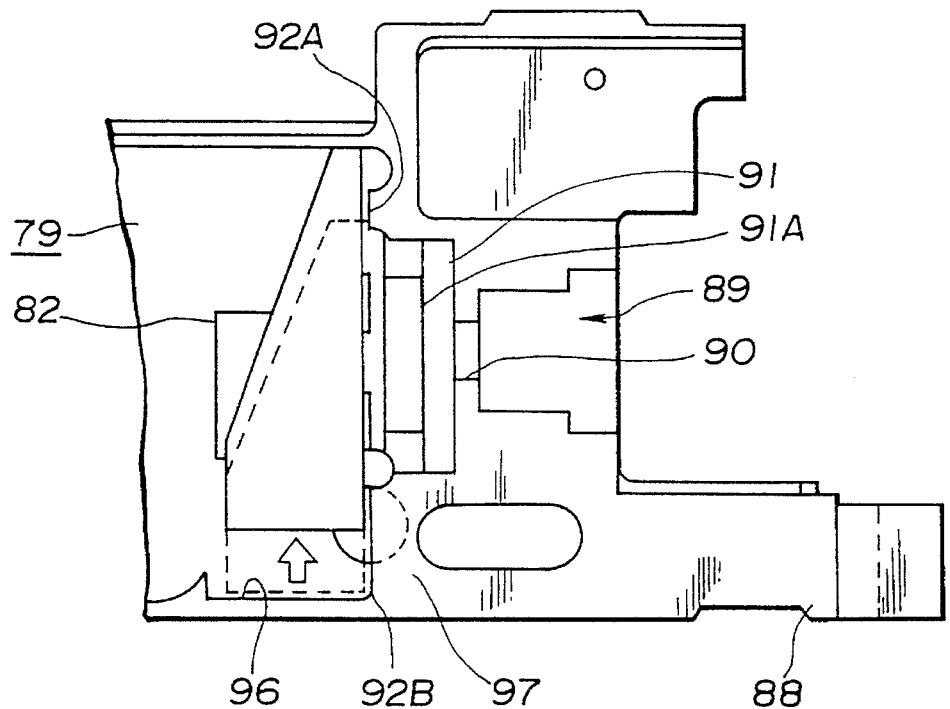

The transition diagrams at the time of adjustment of the multi-lens holder are shown in FIGS. 21A and 21B.

FIG. 21A shows that guide projection 107 of multi-lens holder 100 is engaged with guide groove 96.

In this state, when the adjustment jig 125 is inserted into adjustment jig insertion hole 97 provided at the bottom surface of base member 79 and is then rotationally manipulated, multi-lens holder 100 is moved from the position indicated by dotted lines to the position indicated by solid line as shown in FIG. 21B.

Guide projection 107 is engaged with guide groove 96. Thus, loose movement in a direction perpendicular to the moving direction (direction indicated by arrow of FIG. 21B) of multi-lens holder 100 is limited.

In a manner as described above, multi-lens 85 is mounted (assembled) into multi-lens holder 100 which is movably attached on base member 79 bridging over the first optical path. For this reason, a, large-sized multi-lens holder can be employed as this multi-lens holder 100. Since multi-lens 85 is firmly held at base member 79, there is no possibility that the optical axis of multi-lens 85 may deviate.

Moreover, optical pick-up device 78 can be provided with large-sized multi-lens holder 100, yet not be excessively over-sized itself. Further, since adjustment of multi-lens 85 is carried out by rotationally manipulating adjustment jig 125 through large-sized multi-lens holder 100, its manipulation can be carried out with extreme ease.

It should be noted that while, in the above-described embodiment multi-lens holder 100, multi-lens 85 is attached by containing it within lens mounting recessed portion 104 so as to become in correspondence with the optical axis of the second optical path thereafter to bond (connect) and fix it, in the case where multi-lens holder 100 is molded by synthetic resin material, it may be integrally assembled by-the insert molding method.

In the embodiment optical pick-up device 78 constituted in a manner stated above, optical parts of semiconductor laser 80 fitted into semiconductor laser fitting recessed portion 89 formed at base member 79, grating 81 fitted into grating fitting recessed portion 91, and beam splitter 82 held by beam splitter holding projections 93, 94 and multi-lens holder 100 are assembled on base member 79 and held by resilient holding member 130 mounted on base member 79.

Figure 13:
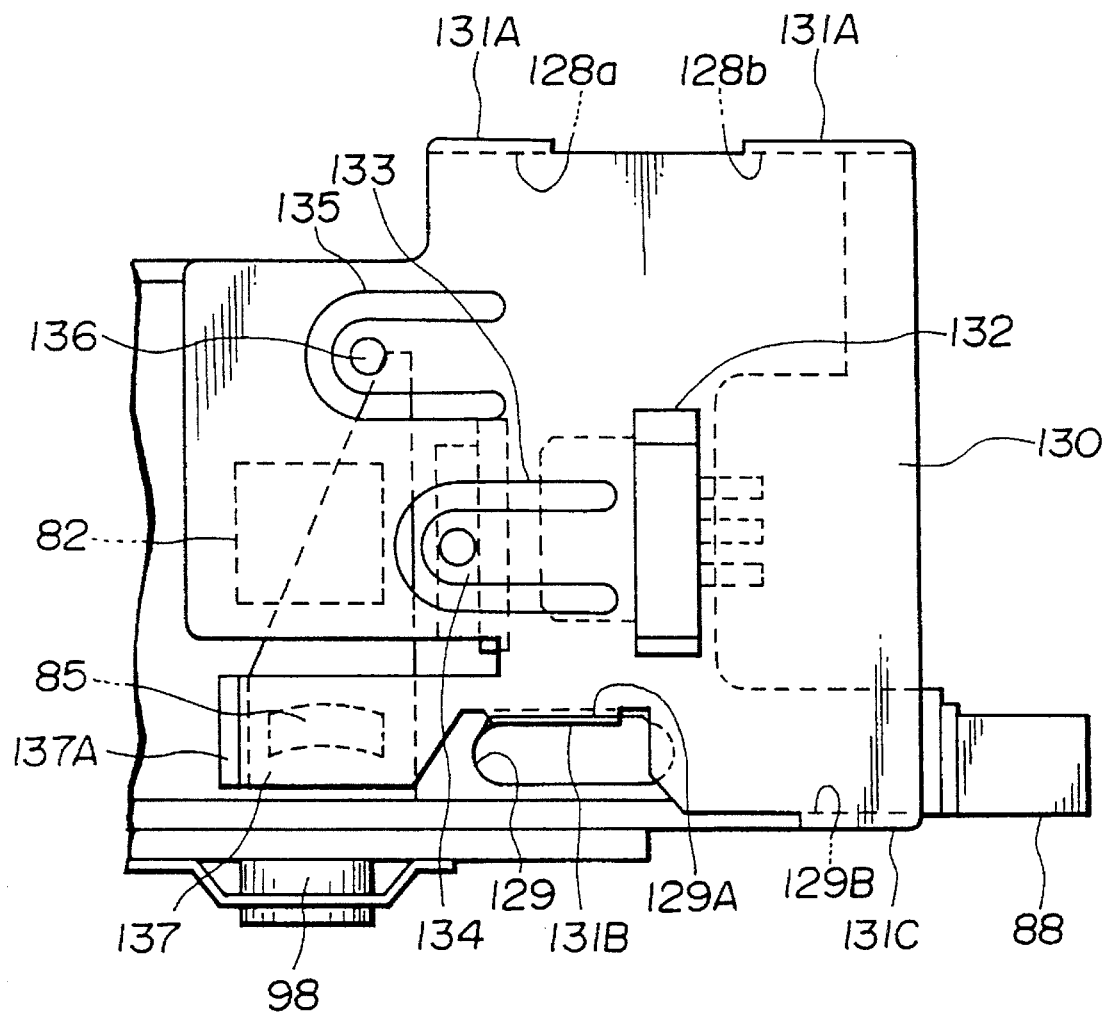
FIG. 13 is a plan view showing the essential part of the state where the resilient holding member for holding optical parts is affixed in the optical pick-up device of the invention of this application.

Resilient holding member 130 is formed by a metallic thin plate having resiliency (elasticity) and a width dimension which is substantially the same dimension as the width dimension of base member 79 as shown in FIG. 13. At one side end portion of this resilient holding member 130, a pair of resilient holding pieces 131A, 131A are integrally formed and bent toward the lower portion in correspondence with engagement portions 128a, 128b. At another side end portion, resilient holding pieces 131B, 131C are integrally formed and bent toward the lower portion in correspondence with engagement portion 129A and engagement portion 129B, respectively.

Accordingly, by allowing the above-described respective resilient holding piece 131 to be relatively engaged with respective corresponding engagement portions 128a, 128b, 129A, 129B, resilient holding member 130 is firmly combined with the base member 79 in a manner to constitute the ceiling surface of base member 79.

As stated above, with resilient holding member 130 combined with base member 79, there is provided a rectangular cut portion 132 which allows a portion of semiconductor laser 80 having a diameter slightly greater than the height dimension of the rising side wall of base member 79 to be exposed toward the outside. Moreover, there is formed resilient holding-portion 134 such that the front end portion thereof is faced to grating fitting recessed portion 91 by boring laterally U-shaped cut portion 133 to form the cut portion 132 and the projection.

Similarly, laterally U-shaped cut portion 135 is bored along the portion the resilient holding member 130 in the vicinity of one rising side wall of base member 79 to form a resilient holding portion 136 having a front end portion extending to the vertex side portion of ceiling wall portion 103 of multi-lens holder 100. The cutting is carried out from one end portion along the portion in the vicinity of the other rising side wall so that resilient holding portion 137 is integrally formed.

Front end portion 137A of the resilient holding portion 137 is bent toward the lower direction so as to become engaged with slanting surface 108 formed at the side end portion of base portion 101 of multi-lens holder 100.

Accordingly, resilient holding member 130 mounted on base member 79 resiliently supports semiconductor laser 80 fitted in semiconductor laser fitting recessed portion 89, grating 81 fitted in grating fitting recessed portion 91, and multi-lens holder 100.

Multi-lens holder 100 presses, in the base member 79 direction, upper surface portion 103 of multi-lens holder 100 by resilient holding portion 136 of resilient holding member 130.

Further, slanting surface 108 of multi-lens-holder 100 is pressed toward step portion wall 92 by front end portion 137A of resilient holding portion 137 of resilient holding member 130.

Thus, multi-lens holder 100 is fixed. As a result, the optical axis extending over beam splitter 82, multi-lens 85 and photo detector 98 is held.

In addition, since there is employed a configuration to resiliently hold multi-lens holder 100 by resilient holding member 130 as described above, adjustment operation of spacing between multi-lens 85 and photo detector 98 can be carried out after optical parts are assembled onto base member 79.

What is claimed is:

1. An optical pick-up device comprising;
   a light source;
   reflecting means for reflecting light emitted from the light source to an object lens;
   object lens driving means for driving the object lens in a focusing direction and in a tracking direction;
   spectral means for optically separating the light emitted from the light source and reflected light from an optical disc incident through the object lens;
   a base member for supporting the light source, the reflecting means, the spectral means and detecting means for detecting the reflected light optically separated by the spectral means;
   a multi-lens disposed between the detecting means and the spectral means to shape form of the reflected light optically separated by the spectral means; and
   multi-lens holding means for holding the multi-lens movably supported on the base member in a moving direction that crosses a first optical path formed between the light source and the spectral means, and is substantially parallel to a second optical path formed between the spectral means and the detecting means.

2. An optical pick-up device as set forth in claim 1, wherein the multi-lens holding means for holding the multi-lens is movable along the second optical path, the multi-lens holding means having a side surface serving as a reference surface which is in sliding contact with a rising peripheral wall of the base member.

3. An optical pick-up device as set forth in claim 2, wherein the multi-lens holding means includes an integrally formed guide projection that is fitted into a guide groove formed at the bottom surface wall of the base member so that loose movement in a direction perpendicular to the moving direction is limited.

4. An optical pick-up device as set forth in claim 1, wherein the multi-lens is integrally mounted into the multi-lens holding means by insert molding.

5. An optical pick-up device as set forth in claim 1, further comprising:
   a resilient holding member for resiliently holding, in a fitting direction, optical parts fitted and assembled onto the base member, said optical parts including said multi-lens holding means wherein said holding member resiliently contacts the multi-lens holding means so that loose movement in the moving direction is limited.

6. An optical pick-up device as set forth in claim 1, wherein the multi-lens holding means includes an engagement portion that partially covers a circular adjustment hole bored into the bottom surface wall of the base member, whereby the multi-lens holding means is movably actuated in the moving direction by inserting into the adjustment hole, and then rotating, an adjustment jig having an engagement piece with a diameter slightly smaller than the diameter of the adjustment hole that engages the engagement portion upon said insertion thereof into the adjustment hole.

\* \* \* \* \*